US011069201B2

(12) United States Patent
Gervais et al.

(10) Patent No.: US 11,069,201 B2
(45) Date of Patent: Jul. 20, 2021

(54) AUTOMATED DEVICE FOR EXCHANGE OF DATA

(71) Applicant: The Toronto-Dominion Bank, Toronto (CA)

(72) Inventors: Steven Gervais, Newmarket (CA); Sara Durning, Toronto (CA); Amanda Buchanan, Toronto (CA); Na-Hyun Sophie Park, Toronto (CA); Gregory James Hamilton, Toronto (CA); Miguel Martin C. Florendo, Toronto (CA); Gary Joseph Fernandes, Mississauga (CA); Nikolay Tzankov Markov, Toronto (CA); Bridget Lennon, Cherry Hill, NJ (US); Tristan Rodzen, Norway, ME (US); James Grimmer, Yardley, PA (US)

(73) Assignee: THE TORONTO-DOMINION BANK, Toronto (CA)

( * ) Notice: Subject to any disclaimer, the term of this patent is extended or adjusted under 35 U.S.C. 154(b) by 0 days.

(21) Appl. No.: 16/152,054

(22) Filed: Oct. 4, 2018

(65) Prior Publication Data
US 2020/0111331 A1 Apr. 9, 2020

(51) Int. Cl.
*G06F 9/451* (2018.01)
*G06F 3/0482* (2013.01)
(Continued)

(52) U.S. Cl.
CPC .......... *G07F 19/206* (2013.01); *G06F 3/0482* (2013.01); *G06F 9/451* (2018.02);
(Continued)

(58) Field of Classification Search
CPC .............. G07F 19/206; G06Q 20/1085; G06Q 20/4014; G06F 9/451; G06F 3/0482; H04L 63/083
See application file for complete search history.

(56) References Cited

U.S. PATENT DOCUMENTS 775,377 A 11/1904 Mitchell
5,297,252 A 3/1994 Becker
(Continued)

FOREIGN PATENT DOCUMENTS

JP 2005149473 6/2005

OTHER PUBLICATIONS

Isa Tala, Designing Haptic Clues for Touchscreen Kiosks, MS Thesis, University of Tampere, https://tampub.uta.fi/bitstream/handle/10024/99652/GRADU-1472825234.pdf?sequence=1&isAllowed=y 2016.

(Continued)

*Primary Examiner* — Beau D Spratt
*Assistant Examiner* — Ashley M Fortino
(74) *Attorney, Agent, or Firm* — Ridout & Maybee LLP

(57) ABSTRACT

Methods and systems for providing physical input at an automated device are described. An automated device provides a sequence of interfaces. The automated device communicates with a server to exchange data, which is used to dynamically populate one or more of the interfaces in the sequence. The interface sequence includes: a physical input type selection interface providing an option to provide physical input; a physical input request interface requesting physical input; a physical input processing interface indicating processing; a data value confirmation interface showing determined value for the physical input; a summary interface indicating restrictions for an account; a data update processing interface indicating further processing; an (Continued)

acknowledgement interface indicating the account was updated to reflect the physical input; and an record preview interface providing a preview of a session record.

18 Claims, 31 Drawing Sheets

(51) Int. Cl.
 *G06Q 20/10* (2012.01)
 *G06Q 20/40* (2012.01)
 *H04L 29/06* (2006.01)
 *G07F 19/00* (2006.01)

(52) U.S. Cl.
 CPC ..... *G06Q 20/1085* (2013.01); *G06Q 20/4014* (2013.01); *H04L 63/083* (2013.01)

(56) References Cited

U.S. PATENT DOCUMENTS

| | | | |
|---|---|---|---|
| 6,012,048 A | 1/2000 | Gustin | |
| 6,966,034 B2 | 11/2005 | Narin | |
| 7,039,600 B1 | 5/2006 | Meek et al. | |
| 7,051,096 B1 | 5/2006 | Krawiec et al. | |
| 7,090,122 B1 | 8/2006 | Warren et al. | |
| 7,225,156 B2 | 5/2007 | Fisher et al. | |
| 7,229,007 B1 | 6/2007 | Swaine | |
| 7,570,646 B2 | 8/2009 | Li et al. | |
| 7,637,421 B1 | 12/2009 | Trocme | |
| 7,644,041 B1 | 1/2010 | Schultz et al. | |
| 7,657,473 B1* | 2/2010 | Meffie | G06Q 20/042 235/379 |
| 7,753,772 B1 | 7/2010 | Walker | |
| 8,408,455 B1 | 4/2013 | Taylor | |
| 8,608,057 B1 | 12/2013 | Crews et al. | |
| 8,688,692 B2 | 4/2014 | Abramson | |
| 9,004,353 B1 | 4/2015 | Black | |
| 9,038,188 B2 | 5/2015 | Adams et al. | |
| 9,196,111 B1 | 11/2015 | Newman et al. | |
| 9,292,840 B1 | 3/2016 | Velline et al. | |
| 9,589,256 B1* | 3/2017 | Thomas | G06Q 20/1085 |
| 9,953,367 B2 | 4/2018 | Del Vecchio et al. | |
| 9,984,411 B1 | 5/2018 | Velline et al. | |
| 10,078,769 B2 | 9/2018 | Bouteleux | |
| 10,332,201 B1 | 6/2019 | Kunz | |
| 10,535,047 B1 | 1/2020 | Thomas et al. | |
| 2001/0014881 A1 | 8/2001 | Drummond et al. | |
| 2001/0044747 A1 | 11/2001 | Ramachandran et al. | |
| 2002/0196238 A1 | 12/2002 | Tsukada et al. | |
| 2003/0033249 A1 | 2/2003 | Ingram et al. | |
| 2003/0040850 A1 | 2/2003 | Najmi | |
| 2003/0046234 A1 | 3/2003 | Takadachi | |
| 2003/0105710 A1 | 6/2003 | Barbara et al. | |
| 2003/0217005 A1 | 11/2003 | Drummond et al. | |
| 2004/0066374 A1 | 4/2004 | Holloway et al. | |
| 2004/0108376 A1 | 6/2004 | Witherspoon | |
| 2004/0133516 A1 | 7/2004 | Buchanan | |
| 2004/0215566 A1 | 10/2004 | Meurer | |
| 2005/0035193 A1 | 2/2005 | Gustin | |
| 2005/0209958 A1 | 9/2005 | Michelsen et al. | |
| 2005/0233797 A1 | 10/2005 | Gilmore et al. | |
| 2005/0240943 A1 | 10/2005 | Smith | |
| 2006/0026114 A1 | 2/2006 | Gregoire et al. | |
| 2006/0038004 A1 | 2/2006 | Rielly et al. | |
| 2006/0139312 A1 | 6/2006 | Sinclair et al. | |
| 2006/0163341 A1 | 7/2006 | Tulluri et al. | |
| 2006/0261149 A1* | 11/2006 | Raghavendra Tulluri | G07F 19/20 235/379 |
| 2007/0181676 A1 | 8/2007 | Mateen et al. | |
| 2007/0215686 A1 | 9/2007 | Matson | |
| 2008/0040265 A1 | 2/2008 | Rackley, III et al. | |
| 2009/0108015 A1 | 4/2009 | Kreamer | |
| 2009/0212104 A1 | 8/2009 | Smith et al. | |
| 2010/0031021 A1 | 2/2010 | Arnold et al. | |
| 2010/0255885 A1 | 10/2010 | Lee et al. | |
| 2010/0325046 A1 | 12/2010 | Milne | |
| 2011/0022484 A1 | 1/2011 | Smith et al. | |
| 2011/0113328 A1 | 5/2011 | Marzke | |
| 2011/0184865 A1 | 7/2011 | Mon et al. | |
| 2011/0251956 A1 | 10/2011 | Cantley et al. | |
| 2011/0288997 A1 | 11/2011 | McBride | |
| 2012/0074217 A1 | 3/2012 | Block et al. | |
| 2012/0173348 A1 | 7/2012 | Yoo | |
| 2012/0197797 A1 | 8/2012 | Grigg et al. | |
| 2012/0223136 A1 | 9/2012 | Drummond | |
| 2012/0286034 A1 | 11/2012 | Smith | |
| 2012/0330769 A1 | 12/2012 | Arceo | |
| 2013/0018787 A1 | 1/2013 | Anderws et al. | |
| 2013/0212015 A1 | 8/2013 | Anthony et al. | |
| 2013/0264384 A1 | 10/2013 | Wadia | |
| 2014/0331131 A1 | 11/2014 | DeSellem | |
| 2014/0331189 A1 | 11/2014 | Lee | |
| 2014/0372268 A1 | 12/2014 | Hazam | |
| 2015/0046794 A1 | 2/2015 | Cardno | |
| 2015/0066761 A1 | 3/2015 | Chang | |
| 2015/0149963 A1 | 5/2015 | Chang et al. | |
| 2015/0178730 A1 | 6/2015 | Gleeson et al. | |
| 2015/0186857 A1 | 7/2015 | Swinfen | |
| 2015/0199681 A1 | 7/2015 | Salgado et al. | |
| 2015/0212677 A1 | 7/2015 | Dunne et al. | |
| 2015/0262183 A1 | 9/2015 | Gervais | |
| 2015/0301722 A1 | 10/2015 | Warnitz | |
| 2016/0086145 A1 | 3/2016 | Tsutsui | |
| 2016/0098692 A1 | 4/2016 | Johnson et al. | |
| 2016/0098904 A1 | 4/2016 | Choudhury et al. | |
| 2016/0180304 A1 | 6/2016 | Carriles | |
| 2016/0364729 A1 | 12/2016 | Ruparelia et al. | |
| 2017/0003856 A1* | 1/2017 | Mande | G06Q 30/01 |
| 2017/0006013 A1 | 1/2017 | Mande et al. | |
| 2017/0006028 A1 | 1/2017 | Tunnell et al. | |
| 2017/0006114 A1 | 1/2017 | Mande et al. | |
| 2017/0039818 A1 | 2/2017 | Lee | |
| 2017/0091731 A1* | 3/2017 | Nelson | G06Q 20/1085 |
| 2017/0168691 A1 | 6/2017 | Johansson | |
| 2017/0352021 A1 | 12/2017 | Szeto et al. | |
| 2018/0039616 A1 | 2/2018 | Shalit et al. | |
| 2018/0096302 A1 | 4/2018 | Tseretopoulos et al. | |
| 2018/0114004 A1 | 4/2018 | Hamid | |
| 2018/0225659 A1 | 8/2018 | Yamasaki et al. | |
| 2018/0268414 A1 | 9/2018 | Chung et al. | |
| 2018/0268637 A1 | 9/2018 | Kurian et al. | |
| 2019/0012882 A1 | 1/2019 | Poueriet | |
| 2019/0073663 A1 | 3/2019 | Jamkhedkar et al. | |
| 2019/0096196 A1 | 3/2019 | Cifarelli | |

OTHER PUBLICATIONS

Leah Findlater and Joanna McGrenere, Beyond performance: Feature awareness in personalized interfaces, International Journal of Human-Computer Studies 68.3 (2010): 121-137, http://faculty.washington.edu/leahkf/pubs/IJHCS%20personalization%20author%20copy.pdf 2010.
Ahmed Farooq, Haptics in Kiosks and ATMs for the Disabled, University of Tampere, http://tampub.uta.fi/bitstream/handle/10024/81075/gradu03909.pdf;sequence=1 2009.
Office Action; U.S. Appl. No. 16/152,066 dated Nov. 12, 2019.
Coconuts KL 2014 "Withdrawal systems: GST to be applied to ATM and banking services" 2014.
Lee, "ATM UI Prototyping/ Renovation", slideshare, drafted Jul. 6, 2011, uploaded Jul. 28, 2011 Jul. 28, 2011.
EMV Migration Forum, "Implementing EMV at the ATM: PIN Change at the ATM, Version 1.0", An EMV Migration Forum White Paper, Mar. 2015. 2015.
HowToBank, "How to ATM Change PIN", video on Youtube, published on Feb. 27, 2014. 2014.
Kumar, "How to Transfer Money to Other Bank Account Through CDM (Cardless)", Accounting Education, published on Dec. 21, 2015. 2015.

(56) References Cited

OTHER PUBLICATIONS

TD Canada Trust, "Ways to Bank—Green Machine ATM—How to Transfer Between Acocunts", company website, accessed Aug. 18, 2014. 2014.
Scholl, "Bank of America ATM Deposit", video on YouTube, published Oct. 6, 2016. 2016.
Brouillette, "Making ADA Compliance a Priority", Advanced Kiosks, published May 15, 2018. 2018.
ShinyPress, Using a Bank Machine (ATM) to Make a Withdrawal, video on YouTube, published on Jul. 8, 2013. 2013.
Iucadp, "Concept of ATM", stock image on Canstockphoto, published on Mar. 3, 2016. 2016.
Thunder Tech Pro, "How to Use ATM. Simple Video. Step by Step Full Procedure", video on YouTube, published on Apr. 22, 2017. 2017.
BhattiXpert, "How to Use ATM Machine HBL (2017))", video on YouTube, published on Dec. 29, 2016. 2016.
TD Bank, "Flow Do I Change My PIN Number", TD Bank website, employee Colleen B on Mount Laurel on Sep. 10, 2014. 2014.
SELCO Community Credit Union, "Flow to Deposit Checks in Our Upgraded ATMs", Feb. 7, 2013, YouTube Video—https://www.youtube.com/watch?v=MxfjdDcRGi8. 2013.
Forward Bank, "Smart Deposit ATM Demo", Oct. 31, 2014, YouTube video—https://www.youtube.com/watch?v=aoHoD5Evot4. 2014.
NCR Corporation, "Intelligent ATM Machines: NCR Intelligent Check Deposit Video"—May 4, 2015, YouTube video—https://www.youtube.com/watch?v=2xT96BrVBXo. 2015.
Lego Bank, "How to Lodge Money in a Cash and Cheque Lodgement ATM", Feb. 8, 2015, YouTube video—https://www.youtube.com/watch?v=fvw0mhemUYs. 2015.
Scholl, "US Bank ATM Check Deposit", Mar. 30, 2015, YouTube video—https://youtube.com/watch?v=4oxq0tgwpL4. 2015.
Pinay Investor, "How to Check Transactions in BPI Express Online", Nov. 2, 2015, YouTube video—https://www.youtube.com/watch?v=KD2SWCs7nYA. 2015.
Rathaur, "How to Deposit Money in ATM", Mar. 23, 2016, YouTube video—https://youtube.com/watch?v=RQbjXtJVJ_o. 2016.
Scholl, "How Eeasay it is to Deposit Money into the Bank of America ATM", Oct. 1, 2016, YouTube video—https://www.youtube.com/watch?v=sRdyalenYZQ. 2016.
NCR Corporation (https://www.youtube.com/watch?v+1Wh7kZ70piQ), "Intelligent ATM Machines: NCR Intelligent Cash Deposit"—May 4, 2015. 2015.
Emirates NBD, "How to deposit Cheque into CDMs", https://www.youtube.com/watch?v=c4rhspQBKas, Aug. 30, 2016. 2016.
NCR Corporation, NCR SelfSery 80 Series ATM Family, https://www.youtube.com/watch?v=7MICCIn9RO0, Oct. 18, 2017. 2017.
NCR Corporation, "NCR Scalable Deposit Modile (SDM) Banking Software Video", https://www.youtube.com/watch?v=qQWKk3Rd-K8, Nov. 13, 2017. 2017.
Firstbankok, "FirstBank ATM Deposit", https://www.youtube.com/watch?v=594jnG4tgpE, Nov. 13, 2017. 2017.

Regions Bank, "Regions DepositSmart ATMs | Regions Bank", https://www.youtube.com/watch?v=2A0i25M9IW0, Sep. 26, 2017. 2017.
SewGenius, "Flow to do a check deposit on a Suntrust Bank ATM", https://www.youtube.com/watch?v=puxovvQkfYk, Aug. 27, 2017. 2017.
Office Action; U.S. Appl. No. 16/152,027 dated Jan. 22, 2020.
Office Action; U.S. Appl. No. 16/152,083 dated Jan. 30, 2020.
Office Action; U.S. Appl. No. 16/152,113; dated Jan. 2, 2020.
Office Action; U.S. Appl. No. 16/152,074 dated Oct. 2, 2019.
Advisory Action; U.S. Appl. No. 16/152,074 dated Apr. 17, 2020.
Office Actiion; U.S. Appl. No. 16/392,905 dated Jun. 16, 2020.
Final Rejection, U.S. Appl. No. 16/152,083 dated Jul. 9, 2020.
J.D. Biersdorfer Q and A: Scanning Checks at the ATM; the new york times blog May 8, 2013.
Final Rejection; U.S. Appl. No. 16/152,027 dated Jul. 16, 2020.
Prasanna Zore, Things you can do with your ATM Card Feb. 21, 2007.
TheFinancialBrand, Wells Fargo's ATMs know you better Feb. 20, 2013.
Advisory Action; U.S. Appl. No. 16/152,083 dated Sep. 28, 2020.
Advisory Action; U.S. Appl. No. 16/152,027 dated Sep. 29, 2020.
Advisory Action; U.S. Appl. No. 16/152,113 dated Aug. 17, 2020.
Office Action; U.S. Appl. No. 16/152,074 dated Sep. 9, 2020.
Mengxing Zhang et al., A Survey on Human Computer Interaction Technology for Financial Terminals; pp. 174-177 2012.
Office Action; U.S. Appl. No. 16/152,143; dated Sep. 11, 2020.
Office Action; U.S. Appl. No. 16/152,066 dated Apr. 8, 2020.
Notice of Allowance; U.S. Appl. No. 16/152,066 dated Jul. 1, 2020.
Final Rejection; U.S. Appl. No. 16/152,113 dated May 28, 2020.
Final Rejection; U.S. Appl. No. 16/392,905 dated Oct. 28, 2020.
Office Action; U.S. Appl. No. 16/152,113 dated Nov. 3, 2020.
Wikipedia—IP Fragmentation 2020.
Wikipedia—Packet Switching 2020.
LiveAction: What is a Network Packet? 2020.
Office Action; U.S. Appl. No. 16/152,074 dated Feb. 10, 2020.
Office Action; CA Application No. 3019824 dated Feb. 2, 2021.
Office Action; U.S. Appl. No. 16/152,074 dated Mar. 19, 2021.
Office Action; U.S. Appl. No. 16/152,027 dated Mar. 19, 2021.
Office Action; U.S. Appl. No. 16/152,083 dated Apr. 5, 2021.
Office Action; U.S. Appl. No. 16/152,113 dated Feb. 22, 2021.
NCR Corporation, "NCR Scalable Deposit Module: Fast Cash and Check Deposit Video", May 23, 2011, https://www.youtube.com/watch?v+O_hLwYOiG-k) (Year: 2011) 2011.
Clarydan Clara ("NCR ATM—SCPM Check Deposit", Nov. 20, 2013, https://www.youtube.com/watch?v=lvGB99NFbI8) (Year: 2013) 2013.
Peninsula Credit Union ("How to Make a Cheque Deposit", Jul. 30, 2018,https://www.youtube.com/watch?v=05t2DzLEVGA) 2018.
G. Mujtaba and T. Mahmood, "Adaptive Automated Teller Machines—Part II," 2011 International Conference on Information and Communication Technologies, Karachi, Pakistan, 2011, pp. 1-6, doi: 10.1109/ICICT.2011.5982541 2011.

* cited by examiner

AUTOMATED DEVICE FOR EXCHANGE OF DATA

FIELD

The present disclosure is related to an automated device providing an interface enabling exchange of data.

BACKGROUND

An automated device may enable a user to perform a variety of actions related to a user account. The automated device may enable exchange of data with a backend server that manages the user account, in order to update, output information about, or otherwise perform an action related to the user account. The automated device may provide a sequence of interfaces to enable the user to perform a selected action related to the user account. For example, the automated device may be an automated teller machine (ATM), which may provide a sequence of interfaces to enable the user to perform an action related to the user's account at a service provider such as a financial institution.

User interaction with such an automated device may be time-consuming and frustrating for a number of reasons. For example, a user may find it time-consuming when there are a high number of inputs required to complete a desired action, or a user may find it frustrating when there is too much or too little information provided during the interaction. Further, interactions with the automated device can be challenging and prone to errors for certain users, particularly seniors, users with disabilities, users with language comprehension challenges, and users who are uncomfortable with technology. Accordingly, there is a need for methods, devices and systems related to user interactions with automated devices.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
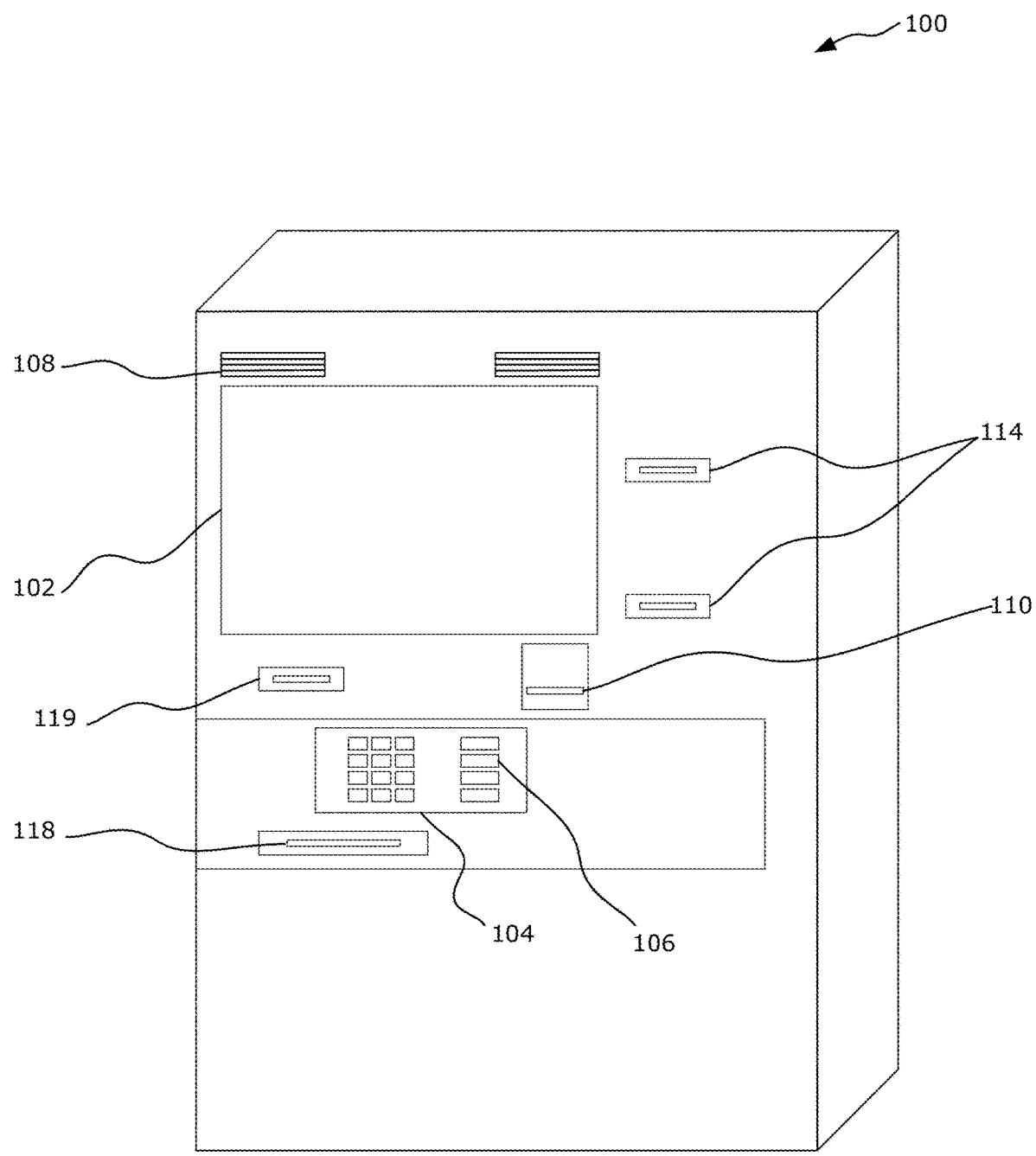
FIG. 1 is a schematic diagram of an example automated device, in accordance with example embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium. Elements referred to in the singular may be implemented in the plural and vice versa, except where indicated otherwise either explicitly or inherently by context. The term "directly" is used herein to mean automatically and without intervening operations.

In accordance with one aspect of the present disclosure, there is provided an automated device including: a display screen; a communication module for communication with a server; an optical scanner for processing physical input; a processor coupled to the display screen, the optical scanner and to the communication module; and a memory coupled to the processor, the memory having machine-executable instructions stored thereon. The instructions, when executed by the processor, cause the automated device to, during a session: display, on the display screen, a physical input type selection interface providing an option to provide physical input to the automated device, the physical input being used to update data associated with an account managed by the server; directly in response to selection of the option to provide physical input, display, on the display screen, a physical input request interface requesting the physical input; process, using the optical scanner, the physical input to determine a data value represented by the physical input; display, on the display screen, a physical input processing interface providing output indicating processing of the physical input; directly in response to completion of the processing, display, on the display screen, a data value confirmation interface indicating the determined data value, the data value confirmation interface providing an option to confirm the data value; directly in response to selection of the option to confirm the data value, display, on the display screen, a summary interface providing indications of any restrictions associated with the account, and also providing an option to complete the physical input; directly in response to selection of the option to complete the physical input, transmit a first signal to the server, via the communication module, the first signal including the data value; display, on the display screen, a data update processing interface providing output indicating further processing of the physical input; directly in response to receipt of a second signal from the server, via the communication module, indicating that the account has been updated with the data value, display, on the display screen, an acknowledgement interface indicating the account has been updated, the acknowledgement interface further providing an option to end the session and an option to continue the session; and directly in response to selection of the option to end the session, display, on the display screen, an record preview interface, the record preview interface providing a preview of a record of the session, the record preview interface further providing an option to generate output of the record.

In accordance with another aspect of the present disclosure, there is provided a method at an automated device. The method includes: displaying a physical input type selection interface providing an option to provide physical input to the automated device, the physical input being used to update data associated with an account managed by a server in communication with the automated device; directly in response to selection of the option to provide physical input, displaying a physical input request interface requesting the physical input; process, using an optical scanner at the automated device, the physical input to determine a data value represented by the physical input; displaying a physical input processing interface providing output indicating processing of the physical input; directly in response to completion of the processing, displaying a data value confirmation interface indicating the determined data value, the data value confirmation interface providing an option to confirm the data value; directly in response to selection of the option to confirm the data value, displaying a summary interface providing indications of any restrictions associated with the account, and also providing an option to complete the physical input; directly in response to selection of the option to complete the physical input, transmit a first signal to the server, via a communication module of the automated device, the first signal including the data value; displaying a data update processing interface providing output indicating further processing of the physical input; directly in response to receipt of a second signal from the server, via the communication module, indicating that the account has been updated with the data value, displaying an acknowledgement interface indicating the account has been updated, the acknowledgement interface further providing an option to end a session at the automated device and an option to continue the session; and directly in response to selection of the option to end the session, displaying an record preview interface, the record preview interface providing a preview of a record of the session, the record preview interface further providing an option to generate output of the record.

In accordance with another aspect of the present disclosure, there is provided a non-transitory machine readable medium having tangibly stored thereon executable instructions for execution by a processor of an automated device. The instructions, when executed by the processor, cause the automated device to, during a session: display, on a display screen of the automated device, a physical input type selection interface providing an option to provide physical input to the automated device, the physical input being used to update data associated with an account managed by server in communication with the automated device; directly in response to selection of the option to provide physical input, display, on the display screen, a physical input request interface requesting the physical input; process, using an optical scanner of the automated device, the physical input to determine a data value represented by the physical input; display, on the display screen, a physical input processing interface providing output indicating processing of the physical input; directly in response to completion of the processing, display, on the display screen, a data value confirmation interface indicating the determined data value, the data value confirmation interface providing an option to confirm the data value; directly in response to selection of the option to confirm the data value, display, on the display screen, a summary interface providing indications of any restrictions associated with the account, and also providing an option to complete the physical input; directly in response to selection of the option to complete the physical input, transmit a first signal to the server, via a communication module of the automated device, the first signal including the data value; display, on the display screen, a data update processing interface providing output indicating further processing of the physical input; directly in response to receipt of a second signal from the server, via the communication module, indicating that the account has been updated with the data value, display, on the display screen, an acknowledgement interface indicating the account has been updated, the acknowledgement interface further providing an option to end the session and an option to continue the session; and directly in response to selection of the option to end the session, display, on the display screen, an record preview interface, the record preview interface providing a preview of a record of the session, the record preview interface further providing an option to generate output of the record.

In accordance with another aspect of the present disclosure, there is provided an automated device. The automated device includes: a display screen; a communication module for communication with a server; an optical scanner for processing physical input; a processor coupled to the display screen, the optical scanner and the communication module; and a memory coupled to the processor, the memory having machine-executable instructions stored thereon. The instructions, when executed by the processor, cause the automated device to, during a session: display, on the display screen, a physical input type selection interface providing an option to provide physical input to the automated device, the physical input being used to update data associated with an account managed by the server; directly in response to selection of the option to provide physical input, display, on the display screen, a physical input request interface requesting the physical input; process, using the optical scanner, the physical input to determine a data value represented by the physical input; directly in response to completion of the processing, display, on the display screen, a data value confirmation interface indicating the determined data value, the data value confirmation interface providing an option to confirm the data value; directly in response to selection of the option to confirm the data value, display, on the display screen, a summary interface providing indications of any restrictions associated with the account, and also providing an option to complete the physical input; directly in response to selection of the option to complete the physical input, transmit a first signal to the server, via the communication module, the first signal including the data value; directly in response to receipt of a second signal from the server, via the communication module, indicating that the account has been updated with the data value, display, on the display screen, an acknowledgement interface indicating the account has been updated, the acknowledgement interface further providing an option to end the session and an option to continue the session; and directly in response to selection of the option to end the session, display, on the display screen, a record preview interface, the record preview interface providing a preview of a record of the session, the record preview interface further providing an option to generate output of the record.

In any of the above, the option to generate output of the record may include an option to transmit the output of the record to an email address linked to the account, a third signal may be received from the server, via the communication module, the third signal including the email address, and the option to transmit the output of the record to the email address may include a preview of the email address.

Any of the above may include steps or instructions to: directly in response to selection of an option on the record preview interface, display, on the display screen, a goodbye interface, the goodbye interface providing non-sensitive customer appreciation information specific to the account.

Any of the above may include steps or instructions to: extract information from an access card inserted into the automated device; transmit a fourth signal to the server, via the communication module, the fourth signal including the information extracted from the access card; in response to receipt of a fifth signal from the server, via the communication module, the fifth signal providing information identifying the account associated with the access card, display, on the display screen, a welcome interface, the welcome interface providing at least some of a plurality of selectable options for performing an action related to the account; directly in response to selection of one of the selectable options provided by the welcome interface, display, on the display screen, an authentication interface for inputting an authentication code for the account; transmit a sixth signal to the server, via the communication module, the sixth signal including a first electronic input received via the authentication interface; directly in response to receipt of a seventh signal from the server, via the communication module, that the first electronic input is validated for the account, display, on the display screen, an account selection interface, the account selection interface providing a selectable account option; and in response to selection of the selectable account option, proceed to display the physical input type selection interface.

In any of the above, the selectable options displayed on the welcome interface may be dependent on actions currently available at the automated device, and is further dependent on actions permissible for the account.

Any of the above may include steps or instructions to, when the option selected at the welcome interface is an option to provide the physical input, display the physical input type selection interface directly in response to selection of the selectable account option, and wherein the account to be updated is associated with the selected account option.

Any of the above may include steps or instructions to, when the option selected at the welcome interface is an option to display more selectable options: directly in response to selection of the selectable account option, display, on the display screen, an account selection interface, the account selection interface displaying information about an account associated with the selected account option, the account selection interface providing selectable options for updating the account; and directly in response to selection of an option for updating the account, display, on the display screen, the physical input type selection interface.

Any of the above may include steps or instructions to, when the data value cannot be determined using the optical scanner: display, following the physical input processing interface and before the data value confirmation interface, a data value entry interface for receiving a second electronic input representing the data value, the data value entry interface displaying a representation of the received physical input as processed by the optical scanner, the representation being selectable to display an enlarged view of the representation, and the data value entry interface providing an option to return the physical input and an option to confirm the second electronic input; and directly in response to selection of the option to confirm the second electronic input, display, on the display screen, the data value confirmation interface.

In any of the above, the physical input may include a first physical input and a second physical input, processing of the first physical input may be successful and processing of the second physical input may be unsuccessful, and the data value entry interface may be for receiving the second electronic input only with respect to the second physical input.

In any of the above, the data value confirmation interface may provide an option for modifying the determined data value, and any of the above may include steps or instructions to: directly in response to selection of the option for modifying the determined data value, display, on the display screen, a data value modification interface for receiving a third electronic input to modify the data value, the data value modification interface displaying a representation of the physical input as processed by the optical scanner, the representation being selectable to display an enlarged view of the representation, and the data value modification interface providing an option to return the physical input and an option to return to the data value confirmation interface; and directly in response to selection of the option to return to the data value confirmation interface, display, on the display screen, the data value confirmation interface.

Any of the above may include steps or instructions to: directly in response to selection of the option to generate output of the record, display, on the display screen, a record output options interface, the record output options interface providing an option to include, in the output of the record, a representation of the physical input as processed by the optical scanner.

Figure 2:
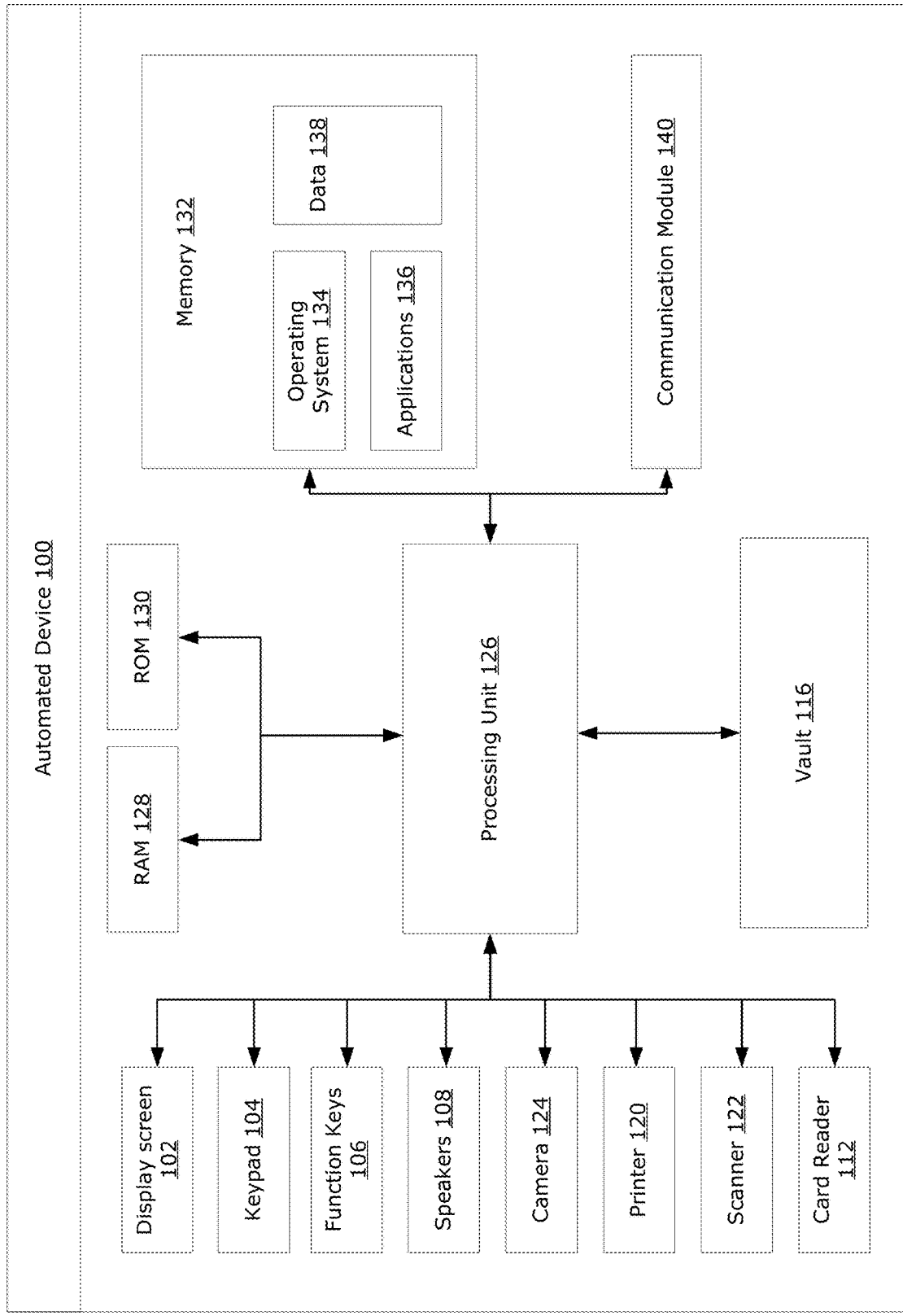
FIG. 2 is a block diagram showing some internal components of the automated device of FIG. 1.

FIGS. 1 and 2 show an example automated device 100 that may be used to implement example embodiments of the present disclosure. The automated device 100 includes one or more input and/or output (I/O) devices that facilitate interaction between the user and the automated device 100. As shown, a display screen 102 is provided which may be a touchscreen or non-touchscreen display. Where the display screen 102 is a touchscreen display, the display screen 102 may serve as both an input device as well as an output device. A graphical user interface (GUI) may be displayed on the display screen 102 to enable any suitable textual and/or graphical output/input.

The example automated device 100 includes a keypad 104 which may be used to provide input to the automated device 100, for example to enter an authentication code (e.g., personal identification number (PIN)) and/or to provide numerical/non-numerical inputs. The keypad 104 may include keys for confirming/cancelling a particular action, and/or navigating through the interface provided by the automated device 100. In some examples, the keypad 104 may include function keys 106 that may be used for specific input (e.g., "Accept", "Cancel"), in addition to multi-function or alphanumeric input keys. In some embodiments, the keypad 104 may be equipped with braille (or other forms of tactile indicators) to improve accessibility for visually impaired users. The automated device 100 may include audio input/output devices, such as a microphone (not shown) for receiving audio user input and, as shown, one or more speakers 108 for providing audio output. Other examples of I/O devices may include, for example, a mouse, an optical reader, and/or a stylus (or other input device(s)) through which a user of the automated device 100 may provide input.

An access card may be received, through a card slot 110, into the automated device 100 to be read by a card reader 112. In some examples, the card reader 112 reads a magnetic strip on the back of the access card to extract information stored thereon. Information may be stored in an integrated circuit (IC) chip embedded within the access card in addition to, or instead of, the magnetic strip, which may be read by the card reader 112. The information read by the card reader 112 may be used to perform functions such as card authentication, card holder validation, and/or account information retrieval.

User interactions with the automated device 100 may include insertion of physical input (e.g., cash and/or check, or other physical representations of data) through one or more input slots 114. The automated device 100 may incorporate sensors (e.g., an optical scanner 122) and/or a digital image processor (not shown) to process the received physical input. Physical output, such as cash, may be extracted from a vault 116 inside the automated device 100 and dispensed to the user through an output slot 118. Another output slot 119 may be used to provide a physical record, such as a paper receipt, of the user's interactions with the automated device 100 during a session. A session on the automated device 100 may be defined to include the inputs, outputs provided on the automated device 100 from the start of user interaction with the automated device 100 (e.g., starting with insertion of an access card into the card slot 110) and ending when the user chooses to end interactions with the automated device 100 (e.g., user provides input to the automated device 100 indicating that all desired actions have completed and/or user logs out). The physical record may be generated by a printer 120 inside the automated device 100. Additionally or alternatively, a record of the session may be emailed to the user. The automated device 100 may include a camera 124, which may be used to record video (e.g., for security purposes) and/or to facilitate interaction between the user and a local or remote agent.

Internally, the automated device 100 includes a processing unit 126 for controlling overall operation of the automated device 100. The processing unit 126 may be operably coupled to one or more of random access memory (RAM) 128, read-only memory (ROM) 130, memory 132, and input/output (I/O) devices such as those described above. Machine-executable instructions may be stored within memory 132 and/or other storage to provide instructions to the processing unit 126 for enabling the automated device 100 to perform various functions. For example, the memory 132 may store instructions for implementing an operating system 134, and one or more application programs 136. The memory 132 may also store data 138 locally. Additionally or alternatively, some or all of the machine-executable instructions for the automated device 100 may be embodied in hardware or firmware (not shown). In this example, the automated device 100 further includes a communication module 140, for wired and/or wireless communication with other network devices (see FIG. 3, for example).

Figure 3:
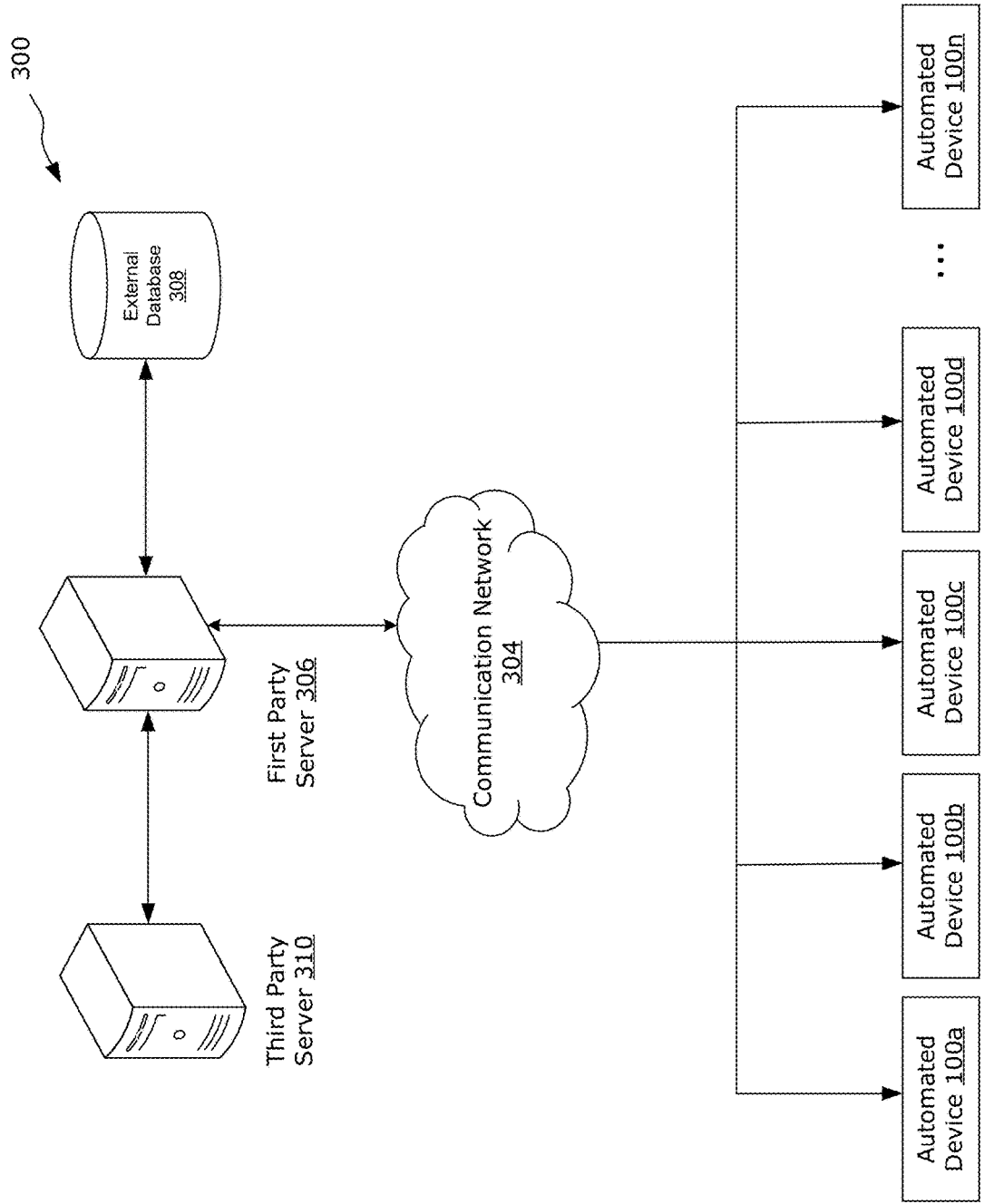
FIG. 3 is a schematic diagram of an example network environment in which example embodiments of the present disclosure may be implemented.

FIG. 3 shows an example network 300 in which the example automated device 100 may be implemented. In this example, a plurality of automated devices 100a-100n may be connected, through a communication network 304, to a server 306 via any suitable communications links, such as network links, wireless links, hard-wired links, and the like. Each of the automated devices 100a-100n may be an instance of the automated device 100 of FIG. 1, or other suitable automated device. The automated devices 100a-100n may be the same or different from each other.

The communication network 304 may include any one or more suitable computer networks including, for example, the Internet, an intranet, a wide-area network (WAN), a wireless WAN (WWAN), a local-area network (LAN), a wireless LAN (WLAN), a wireless network, a digital subscriber line (DSL) network, a frame relay network, an asynchronous transfer mode network, a virtual private network (VPN), a public-switched telephone network (PSTN), or a public-land mobile network (PLMN), or any combination of any of the same. Network communications may be facilitated through the use of any suitable communication such as TCP/IP, Ethernet, FTP, HTTP, HTTPS, and the like. The communication network 304 may be, or may include, an interbank network (which may also be referred to as an ATM consortium or ATM network).

The server 306 may be a backend server associated with the same service provider as the automated devices 100a-100n. The server 306 may be referred to as a first party server. The server 306 may be operable to communicate signals and exchange data with each of the plurality of automated devices 100a-100n. The server 306 in this example network 300 is also coupled to a database 308 that may store data accessible by the server 306. The data stored by the database 308 comprises user account information and provisioning data for data transfers in corresponding records. The database 308 is located externally to and remote from the automated devices 100. The server 306 in this example network 300 is also coupled to a third-party server 310, which may provide third-party services, such as authentication services, or may be associated with another service provider (e.g., another financial institution). The server 306 may be coupled to the database 308 and/or the third-party server 310 via one or more networks (not shown). It is to be appreciated that although one instance each of the server 306, database 308, third-party server 310 and communication network 304 are shown, any of the components in FIG. 3 may be present in any number.

The server 306 includes a controller, including at least one processor which controls the overall operation of the server 306. The processor is coupled to a plurality of components via a communication bus which provides a communication path between the components and the processor. The processor is coupled to a communication module that communicates with corresponding communication modules of the automated devices 100 and the third party server 310 by sending and receiving corresponding signals. The server 306 may include, or may communicate with, a data transfer server (not shown) which generates data transfer instructions via an instruction generation module, sends and/or receives data transfer instructions between various endpoints (e.g., the automated devices 100, the server 306, the third party server 310, etc.) and which may process data transfer instructions via an instruction processing module.

The implementation of the methods described herein include a sequence of interfaces, also referred to as user interfaces or graphical user interfaces (GUIs), to be provided by the automated device, as discussed below. One or more interfaces in the interface sequence may provide one or more selectable options as discussed below, each selectable option being selectable, for example by interacting with a touch-screen and/or a keypad 104 of the automated device 100. The selection options are provided in onscreen buttons or other user interface elements. The selectable options, when selected via corresponding interaction, cause different interfaces to be displayed which may, in some instances, involve communications between the automated device 100 and the server 306 to obtain information to dynamically populate interfaces in the interface sequence. The methods described herein may be implemented during a session with the automated device 100, for example as a portion of the session. The methods described herein may be implemented together to provide a sequence of interfaces.

Figure 4:
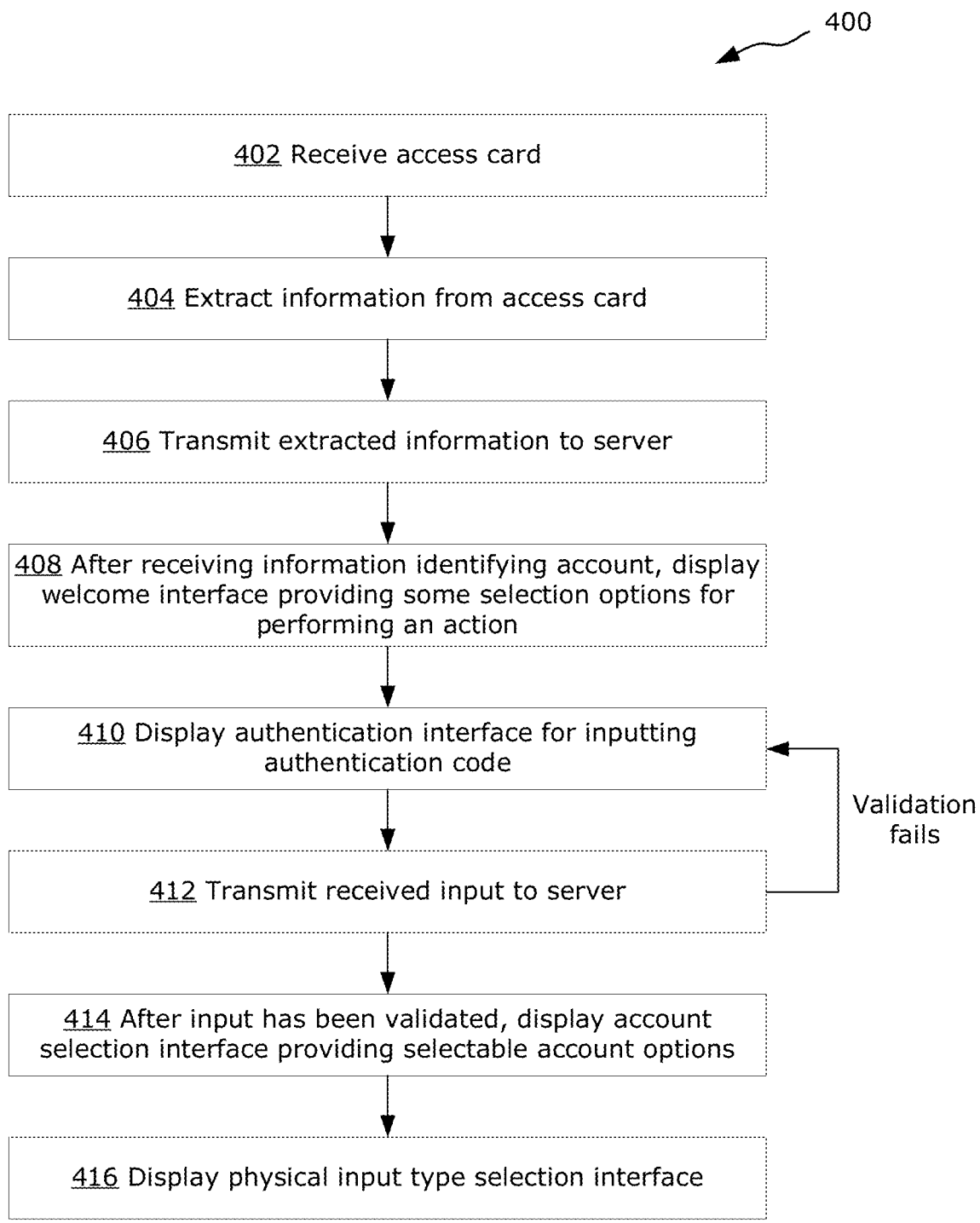
FIG. 4 is a flowchart illustrating an example method for initiating a session at an automated device.

FIG. 4 is a flowchart of an example method 400 for initiating a session on an automated device. The method 400 may be performed by the automated device 100 illustrated in FIG. 1, for example. For convenience, reference will be made to the automated device 100 illustrated in FIG. 1 although automated devices having different features may be used in other embodiments. The session is initiated to perform one or more actions using the automated device. In the present disclosure, the session is initiated to perform an exchange of data at an automated device. The data exchange may be performed in order to update or otherwise change the data stored in an account managed by a server that is in communication with the automated device. The account may be an account at a service provider (e.g., a financial institution) that is associated with the automated device. In particular, a data update may involve updating the account to add (or credit) the data value represented by a physical input, as discussed further below. Data update information, also referred to as provisioning data or data transfer information, may specify how to send and/or receive data updates, including data update signals and other communications and any messages contained therein. The data updates may include messages.

At 402, an access card is received by the automated device (e.g., via a card slot on the automated device).

At 404, the access card is processed by the automated device (e.g., using a card reader) to extract information stored on the access card. The information extracted from the access card may include information used to identify whether the access card is associated with an account that is managed by a service provider (e.g., financial institution) that owns or manages the automated device, or whether the access card is associated with a third-party.

At 406, the automated device transmits the information extracted from the access card to a backend server, for example a first party server owned or managed by the same service provider that owns the automated device, to identify and/or retrieve information about one or more associated accounts. Where the server determines that the access card is associated with a third-party, the server may further communicate with a third-party server to retrieve account information.

The server transmits to the automated device a signal providing information identifying the account(s) associated with the access card. The information provided by the server may include information indicating whether the access card is associated with an account that is managed by a third-party service provider, for example.

Figure 7:
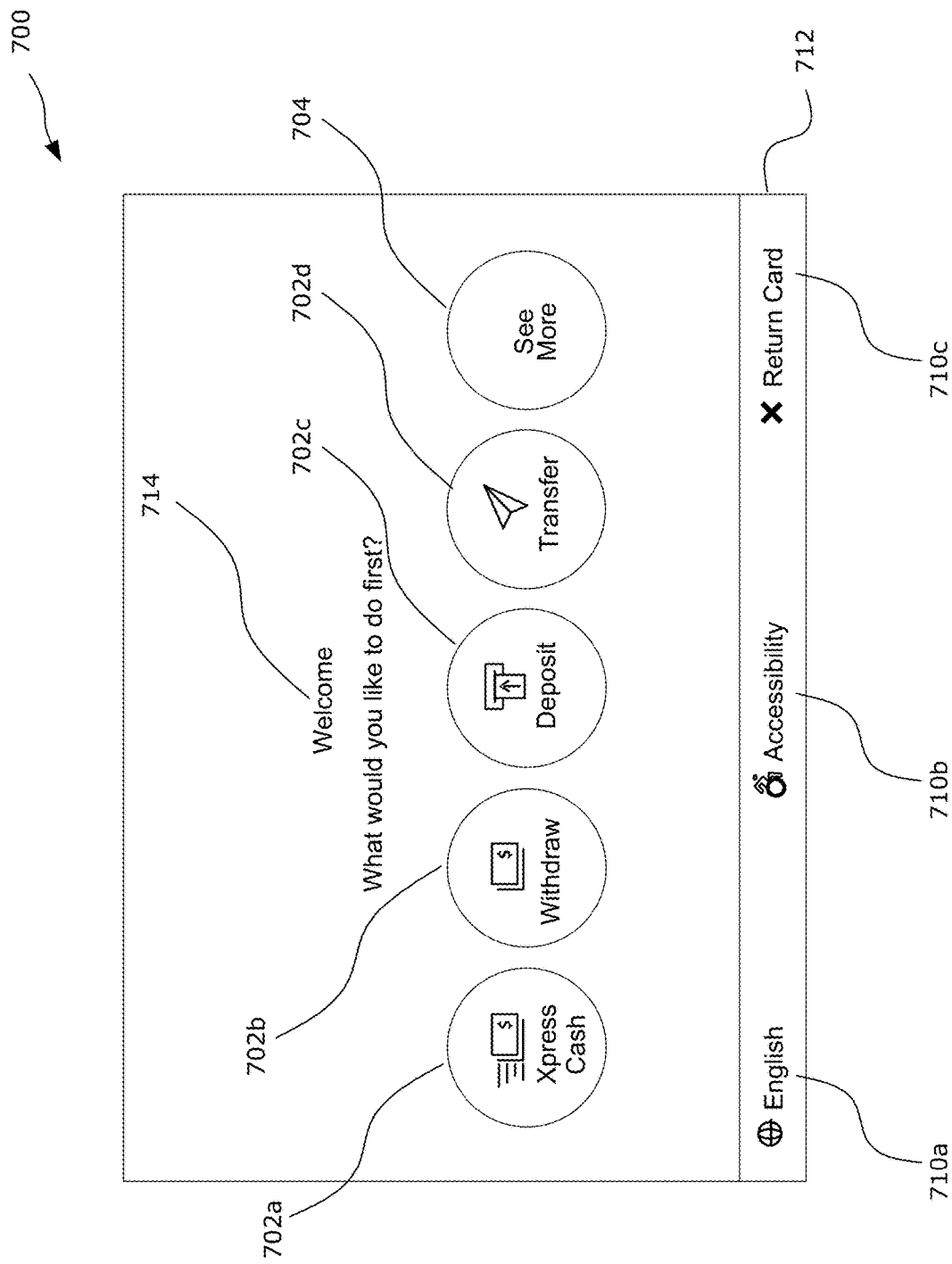
FIG. 7 is an example welcome interface.

At 408, in response to receipt of the information from the server, the automated device displays, the interface 700 shown in FIG. 7 (also referred to as a welcome interface).

As shown in FIG. 7, the interface 700 includes a plurality of selectable options 702a-702d (generally referred to as options 702), which may be selected to initiate an action using the automated device. The options 702 displayed at the interface 700 may be a subset of all available actions that may be performed using the automated device. In some examples, the options 702 displayed at the interface 700 may depend on the capabilities of the automated device and/or the actions that are permissible for the account(s) (e.g., as determined based on the inserted access card). For example, if the account is managed by a third-party service provider, the options 702 may be more limited than if the account is managed by the same service provider that owns the automated device. The provided options 702 may depend on the capabilities of the automated device, for example whether the automated device is able to provide certain types of output (e.g., cash or foreign currency). The options 702 may also be dynamically modified based on the current state of the automated device. For example, the automated device may normally be capable of providing a certain type of output (e.g., cash) but may be in a current state in which that capability is not available (e.g., the automated device has run out of cash).

In FIG. 7, the displayed selectable options 702 include an option 702a for providing express physical output (e.g., express withdrawal of cash), an option 702b for providing physical output (e.g., regular withdrawal of cash), an option 702c for providing physical input (e.g., deposit of cash and/or check), and an option 702d for performing a data transfer between accounts. The interface 700 also provides an option 704 for displaying more available actions.

The interface 700 in this example also includes selectable general options 710a-710c (generally referred to as general options 710). The general options 710 may include options concerning general operation of the automated device and may not be related to any specific action or workflow performed using the automated device. As shown, the general options 710 are provided in a lower portion 712 of the user interface 700, for example, in a bar, panel or frame at or near the bottom of the welcome interface 700. The general options 710 in this example include an option 710a for returning to a previous interface in the sequence of interfaces, an option 710b for displaying accessibility options, and an option 710c to cancel the current action (in this case, the exchange of data using physical input). The option 710a is displayed on the left side of the lower portion 712, the option 710b is displayed at the middle of the lower portion 712, and the option 710c is displayed on the right side of the lower portion 712. Other locations for the general options 710 may be used. The general options 710 may each be provided at the same location over a plurality of interfaces during the session, which may help a user to more easily find each of the general options 710. In particular, the location of the option 710b may enable a user with limited mobility and/or limited reach to more easily select the option 710b for displaying accessibility options.

The user interface 700 may also include a greeting 714. In some examples, the greeting 714 may include non-sensitive customized information, such as a name associated with the user account. Such customized information may be obtained via communication between the automated device and the server. For example, such information may be provided to the automated device together with identification of the account(s) associated with the access card.

Figure 8:
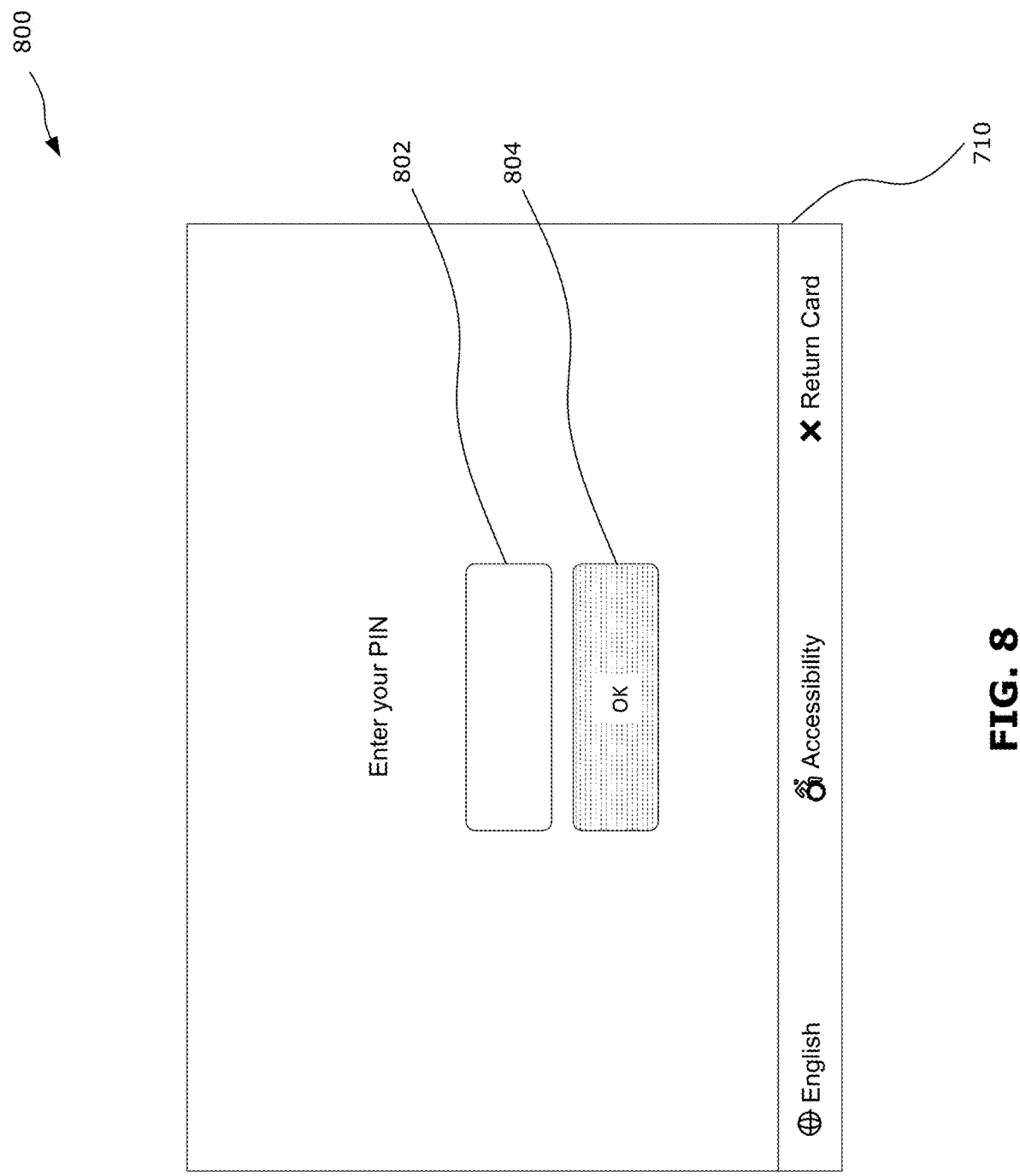
FIG. 8 is an example authentication interface.

At 410, directly in response to selection of one of the options 702, 704, the automated device proceeds to display the interface 800 of FIG. 8 (also referred to as an authentication interface). The interface 800 enables receipt of input of an authentication code associated with the account. The interface 800 may also be referred to as an authentication code entry screen or PIN entry screen.

The interface 800 provides a field 802 for entry of an authentication code (e.g., PIN) associated with the account (e.g., as identified via the inserted access card). Where there are multiple accounts associated with the access card, the same authentication code may be used for all the accounts. In this sense, the authentication code may also be considered to be an authentication code that has been set for the access card. For example, a user may use the keypad of the automated device to provide input into the field 802. The keypad may also provide the ability to backspace or cancel input. Other input mechanisms may also be used. The interface 800 provides a confirmation button 804 to confirm entry of the authentication code. The interface 800 also provides the general options 710 as discussed above. When the confirmation button 804 is selected, the input into the field 802 is received by the automated device. In some examples, instead of selecting the confirmation button 804, the user may use a physical button (e.g., a physical confirmation button or "OK" button, which may be part of the keypad) to confirm entry of the authentication code. Input using a physical confirmation button may be interpreted to be selection of the confirmation button 804. It should be generally understood that, in the present disclosure, selection of any confirmation button may be alternatively input using a physical confirmation button, such as an "OK" button on the keypad.

At 412, the automated device transmits the received input to the server. The server performs validation, for example by comparing the received input to an authentication code associated with the account. If the validation is successful (i.e., the received input matches the authentication code associated with the account), the server transmits a signal to the automated device to indicate that validation is successful. If the validation is not successful (i.e., the received input does not match the authentication code associated with the account), the server transmits a signal to the automated device to indicate that validation failed.

If validation failed, the automated device may generate output (e.g., a visual display) to indicate that the received input does not match the current authentication code. The automated device may again present the interface 800 to re-enter the authentication code.

Figure 9:
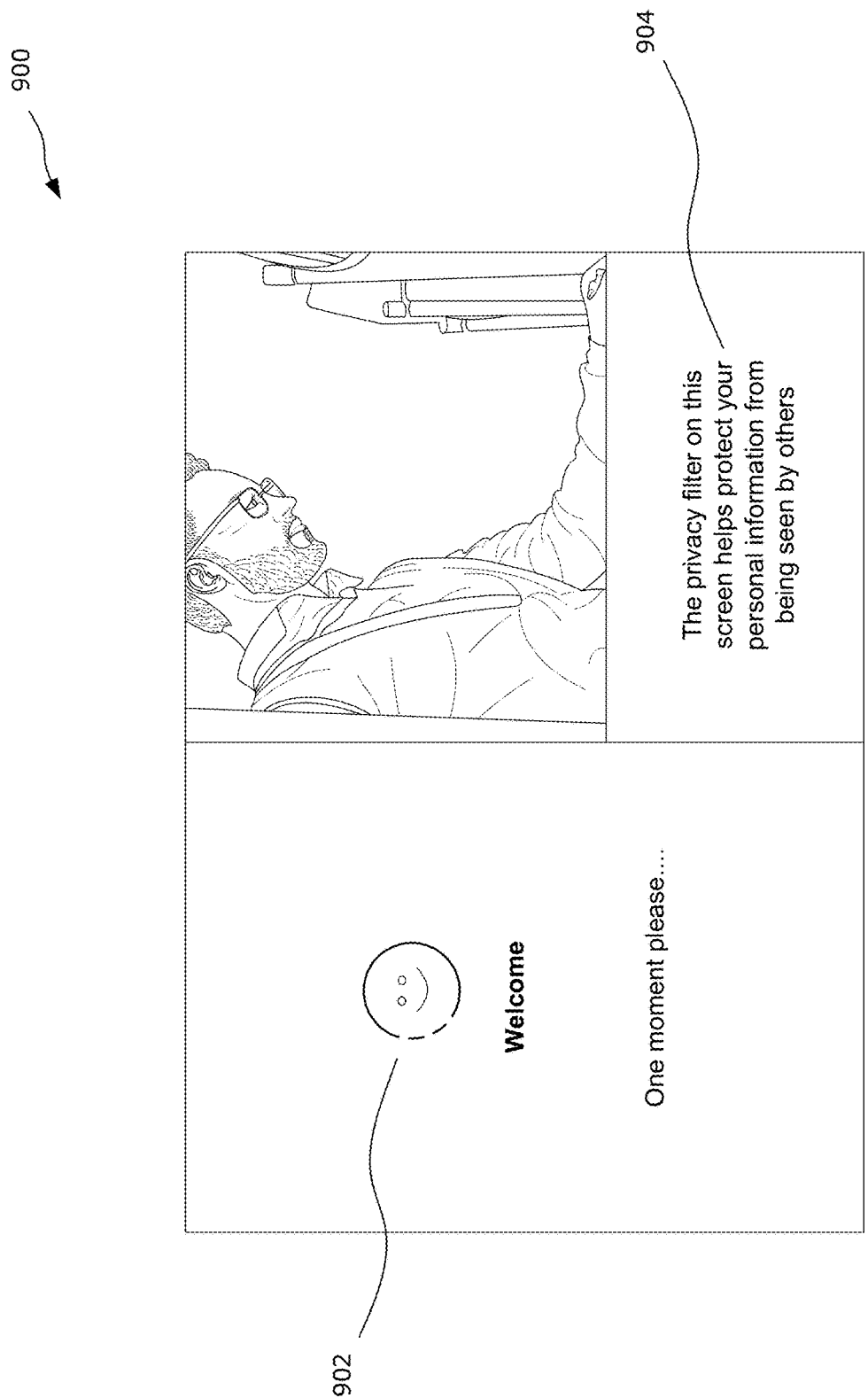
FIG. 9 is an example authentication waiting interface.

The automated device may display the user interface 900 of FIG. 9 (also referred to as an authentication waiting interface) after receiving the input via the interface 800 and before the signal is received from the server.

The user interface 900 in this example includes an animation 902 to indicate processing. Other indicators, with or without animation, may be used. The user interface 900 in this example also displays information 904. The displayed information 904 may or may not be related to the current action being performed, may or may not be specific to the account, and may or may not be specific to the service provider.

The information 904 may be used to inform the user of features and options provided by the automated device and/or service provider associated with the automated device. This may enable new features/options, useful features/options or rarely used features/options to be brought to the user's attention. The information 904 may also provide general user appreciation information, marketing information, or other customized or non-customized information. In some examples, the information 904 may provide customized information, for example customer appreciation information associated with the account, or marketing information customized to the account. Such customized information may be dynamically generated, based on account information provided by the server. In some examples, the information 904 may include dynamic information (e.g., time of day, current temperature, etc.) which may be updated by the automated device or may be provided to the automated device by the server. The interface 900 may be omitted in other embodiments in which the processing or waiting time is negligible.

Figure 10A:
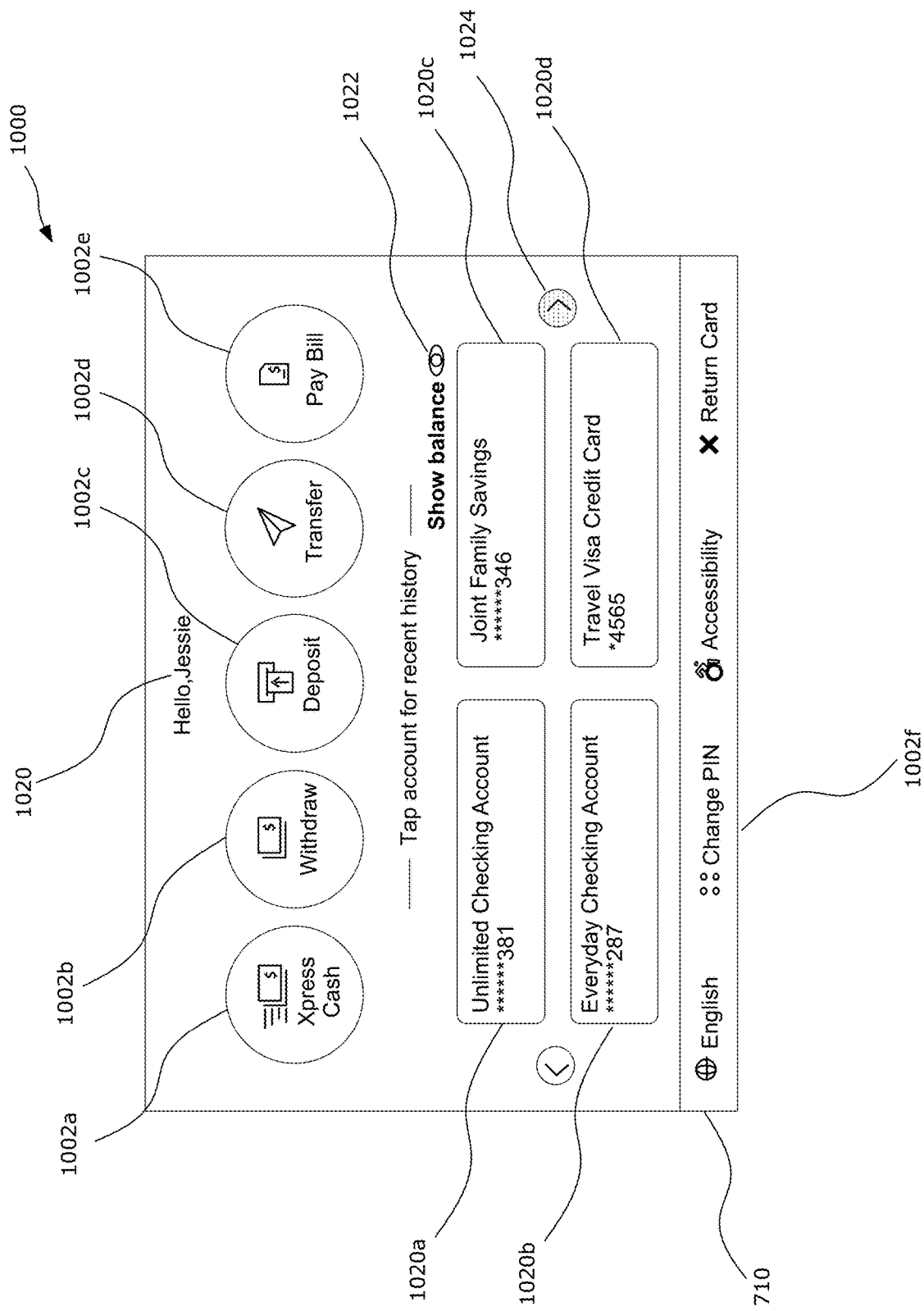
FIG. 10A is an example account selection interface that provides options for selecting an account.
Figure 12A:
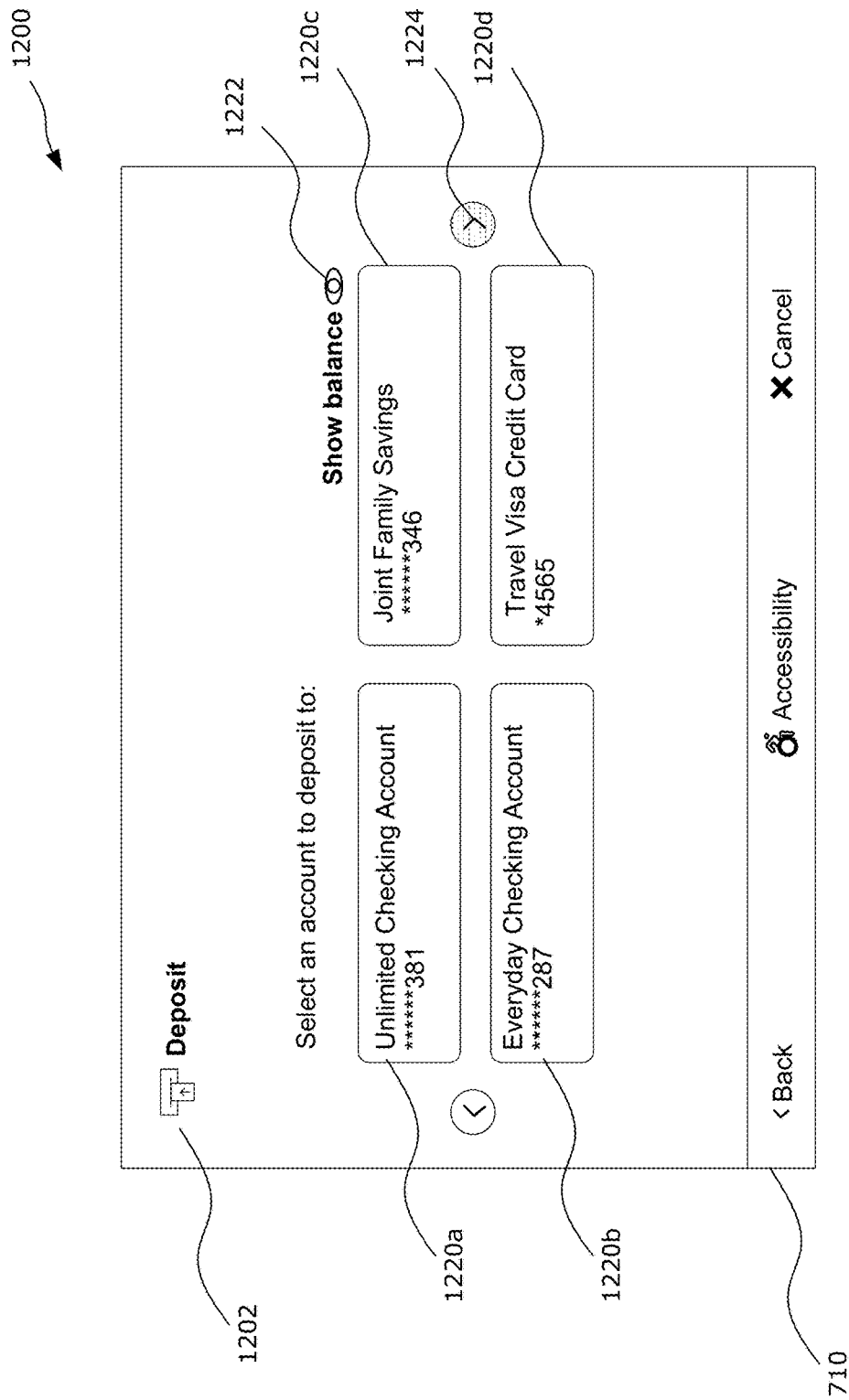
FIG. 12A is another example account selection interface that provides options for selecting an account, in the context of performing an exchange of data.

At 414, in response to receipt a signal from the server that the input received at 410 is validated, the automated device may proceed to display the interface 1000 of FIG. 10A or the interface 1200 of FIG. 12A (both of which may be referred to as an account selection interface) providing selectable account options. Whether the interface sequence displays the interface 1000 or the interface 1200 depends on the selection made at the interface 700 at step 408.

Where the option 702c to provide the physical input was selected at 408, the interface 1200 of FIG. 12A is displayed at 414. The interface 1200 enables selection of an account for data update with the physical input. Notably, the interface 1200 provides options in the context of data update with physical input. This may help to speed up interactions with the automated device.

The interface 1200 includes a context indicator 1202 indicating that the selection of accounts is in the context of providing physical input. The interface 1200 includes general options 710 as discussed above.

The interface 1200 displays one or more selectable account options 1220a-1220d (generally referred to as account option 1220) for selecting an account that has been identified, for example via the inserted access card and communications with the server as discussed above. There may be a plurality of accounts associated with the access card, each of which may be associated with different data and which may be used for performing different data exchange actions. Each account option 1220 may provide some identifying information about the account associated with the respective option, but the identifying information may be at least partially protected (e.g., using * symbols) to avoid sensitive information being inadvertently exposed. In this example, the account options 1220 include options 1220a and 1220b to select a checking account, an option 1220c to select a savings account, and an option 1220d to select a credit card account.

Figure 12B:
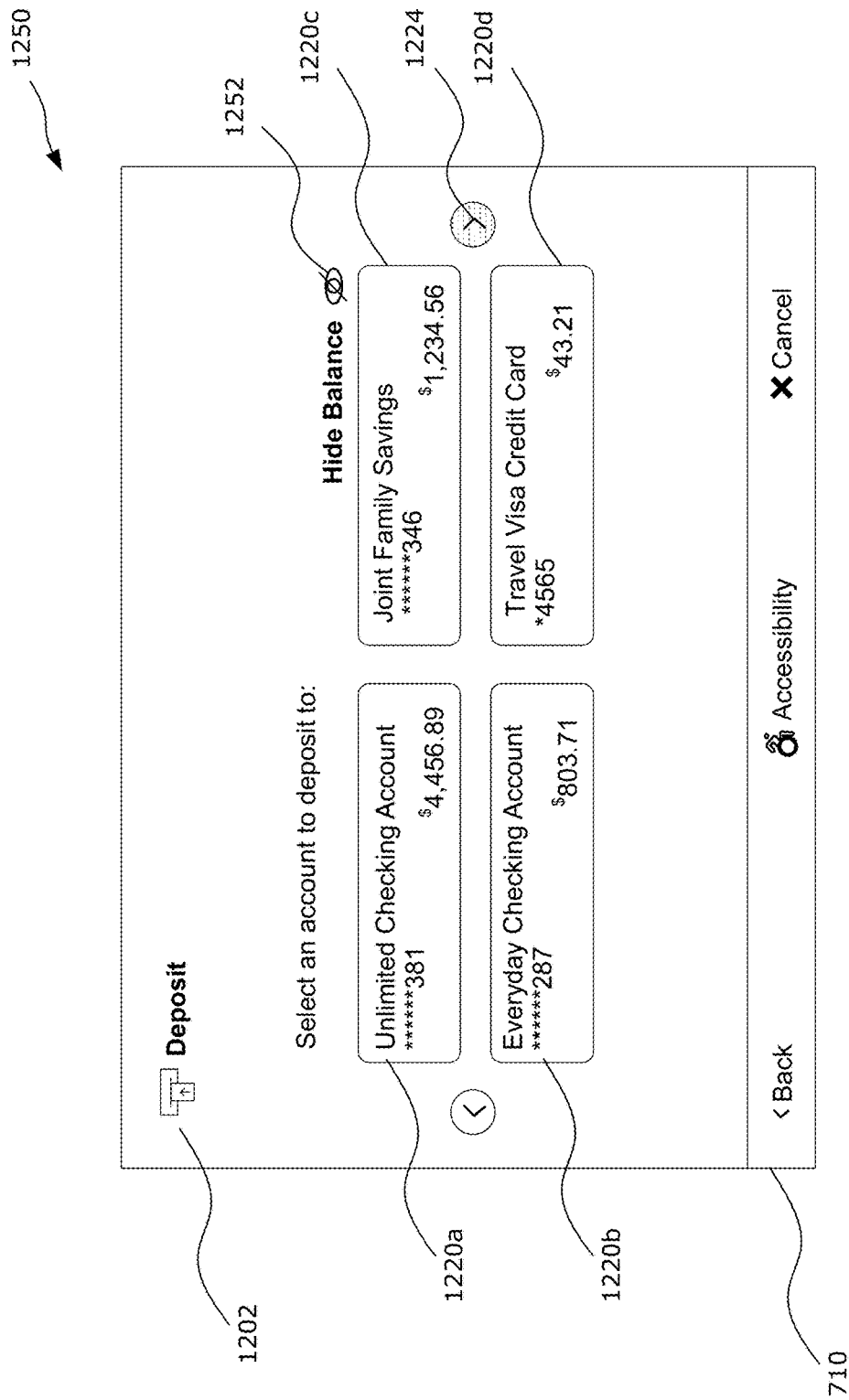
FIG. 12B is another example alternate account selection interface showing the current states of selectable accounts, in the context of performing an exchange of data.

The interface 1200 also provides a selectable option 1222 to display further information about all the accounts associated with the displayed account options 1220. For example, the option 1222 may be selected to cause the account options 1220 to display the current state (e.g., current balance) of each associated account. The option 1222 in this example includes the message "Show balance" and a representative icon or other visual indicator to provide a visual cue. In this example, selecting the option 1222 causes the interface 1250 of FIG. 12B (also referred to as an alternate account selection interface) to be displayed. The interface 1250 is similar to the interface 1200, and the two interfaces 1250, 1200 have common elements. The interface 1250 may be considered a sub-screen, a variation or a transition of the interface 1200. Thus, in some cases, the interface 1250 and the interface 1200 may be considered to be the same interface. In the interface 1250, each account option 1220 is modified to include a visual indication of the current state of the respective associated account (e.g., shows the numerical current balance in each account), and the option 1222 is replaced by an option 1252 to hide the further information. The option 1252 in this example includes the message "Hide balance" and a representative icon or other visual indicator to provide a visual cue. Selection of options 1222 and 1252 may enable a user to toggle or switch between the interfaces 1200 and 1250. Generally, the options and functions available at the interface 1200 are the same at the interface 1250, with the exception of the options 1222 and 1252.

In cases where the number of accounts that have been identified for the access card exceed the number of displayable account options 1220, the user interface 1200 also provides scroll options 1224 to scroll to display additional account options associated with additional accounts.

The information displayed for the options 1220 (e.g., identification of the associated accounts and further information about the current state of each account) may be dynamically provided by the server. For example, the automated device may query the server in real-time (e.g., in response to selection of the option 1222) to obtain the account information to be displayed. The options 1220 may thus be customized in real-time, to provide information that is relevant to the current action and current session at the automated device.

Selection of one of the account options 1220 causes the method 400 to proceed to 416, where the automated device displays the interface 1300 of FIG. 13 for selecting the type of physical input (discussed further below). The account to be updated with the physical input is the account associated with the particular selected account option.

Where the option 704 to display more options was selected at 408, the interface 1000 of FIG. 10A (also referred to as another example of an account selection interface) is displayed at 414. Unlike the interface 1200 of FIG. 12A, the interface 1000 of FIG. 10A is not in the context of performing a data update with physical input.

The interface 1000 provides a plurality of selectable options 1002a-1002f (generally referred to as selectable option 1002) for performing an action. The options 1002 may be similar to the options 702 provided by the interface 700 of FIG. 7, and may include additional options 1002 not displayed in the interface 700. In this example, the selectable options 1002 include an option 1002a for providing express physical output (e.g., express withdrawal of cash), an option 1002b for providing physical output (e.g., regular withdrawal of cash), an option 1002c for providing physical input (e.g., deposit of cash and/or check), an option 1002d for performing a transfer (e.g., of data or funds) between accounts, an option 1002e for performing one or more bill payments, and an option 1002f for changing an authentication code (e.g., a PIN).

The interface 1000 in this example also includes general options 710 as discussed above. Optionally, the interface 1000 may also include a greeting 1020. In some examples, the greeting 1020 may include non-sensitive personalized information, such as a name associated with the user account. As discussed above, such customized information may be dynamically generated using information received from the server.

The interface 1000 also displays one or more selectable account options 1020a-1020d (generally referred to as account option 1020), similar to the account options 1220 described above. The account options may be populated with information received from the server, as discussed above.

Figure 10B:
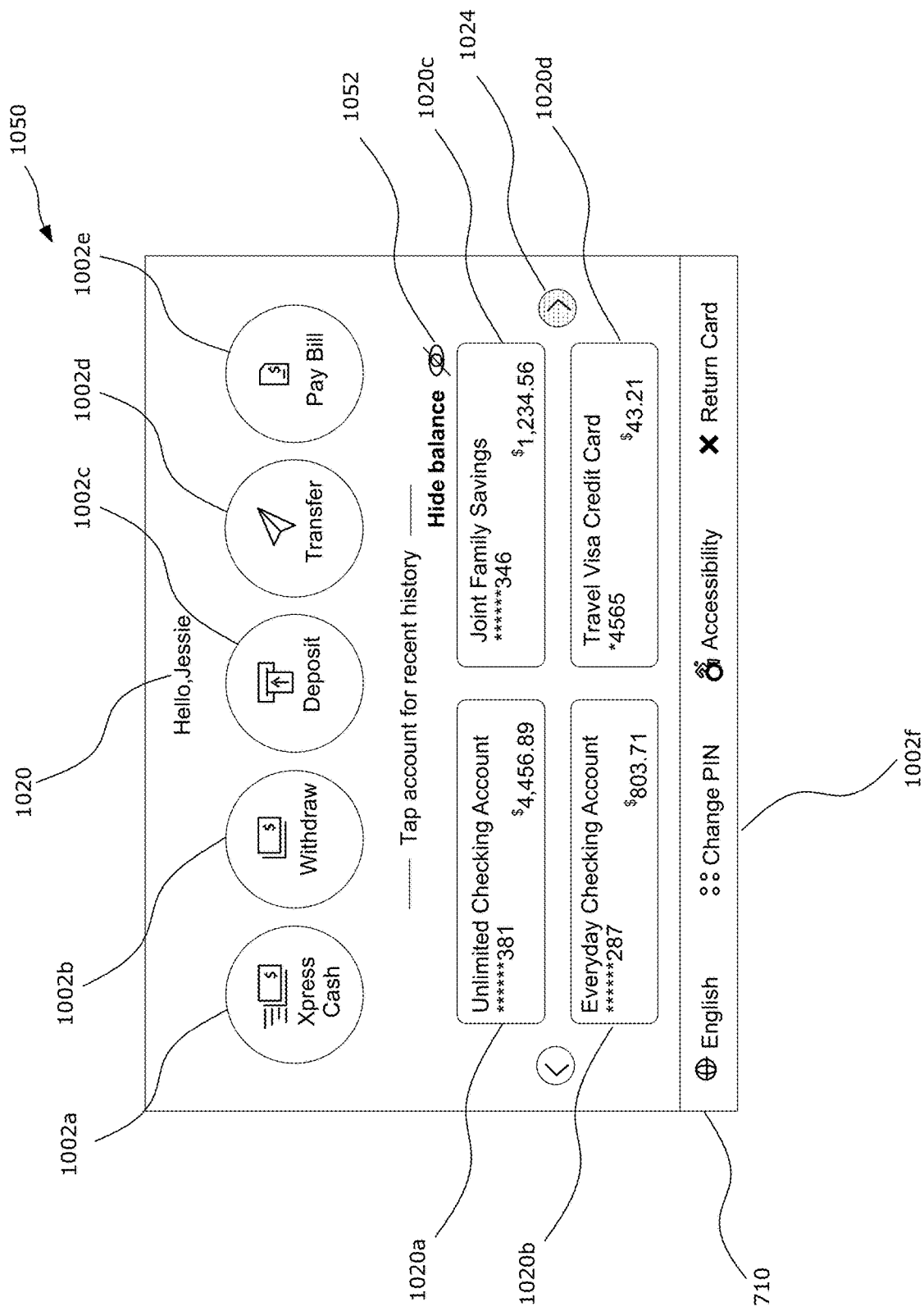
FIG. 10B is an example alternate account selection interface showing the current states of selectable accounts.

The interface 1000 also provides a selectable option 1022 to display further information about all the accounts associated with the displayed account options 1020. For example, the option 1022 may be selected to cause the account options 1020 to display the current state (e.g., current balance) of each associated account. In this example, selecting the option 1022 causes the interface 1050 of FIG. 10B (also referred to as another example alternate account selection interface) to be displayed. The interface 1050 is similar to the interface 1000, and the two interfaces 1050, 1000 have common elements. The interface 1050 may be considered a sub-screen, a variation or a transition of the interface 1000. Thus, in some cases, the interface 1050 and the interface 1000 may be considered to be the same interface. Similar to the interface 1250 of FIG. 12B, in the interface 1050, each account option 1020 is modified to include a visual indication of the current state of the respective associated account (e.g., shows the numerical current balance in each account), and the option 1022 is replaced by an option 1052 to hide the further information. Selection of options 1022 and 1052 may enable a user to toggle or switch between the interfaces 1000 and 1050. Generally, the options and functions available at the interface 1000 are the same at the interface 1050, with the exception of the options 1022 and 1052.

In cases where the number of accounts that have been identified for the access card exceed the number of displayable account options 1020, the user interface 1000 also provides scroll options 1024 to scroll to display additional account options associated with additional accounts.

If the option 1002*c* to provide physical input is selected, the automated device proceeds to display the interface 1200 of FIG. 12A, to select an account to be updated with the physical input.

Each account option 1020 is selectable in order to display further information (e.g., recent data history such as recent exchanges of data on that account) about the individual account associated with the selected option 1020 and/or to initiate an action for that individual account.

Figure 11:
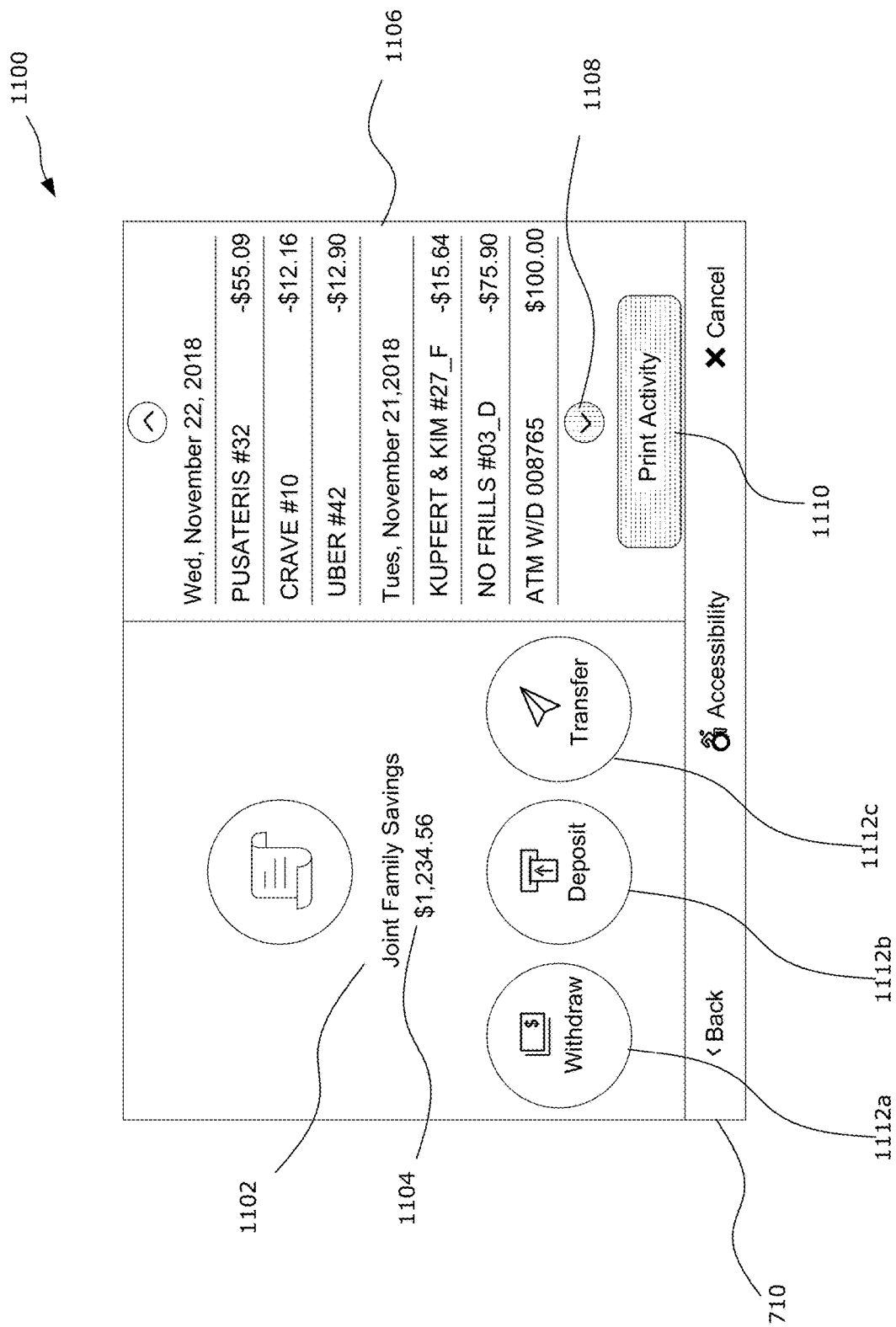
FIG. 11 is an example account information interface that provides information about a selected account.

Directly in response to selection of an account option 1020, the automated device displays the interface 1100 of FIG. 11 (also referred to as an account information interface). The interface 1100 provides further information about the specific selected account. For example, the automated device may query the server in order to obtain further information for the selected account, in order to dynamically generate the interface 1100. The automated device may transmit a signal to the server indicating the selected account (e.g., including an identifier for the selected account) for which further information is requested. In response, the server may transmit a signal to the automated device providing current information about the account, such as the current state (e.g., current balance) of the account, and historical information (e.g., recent data transfers, such as recent bill payments) for the account. In this way, the automated device may dynamically generate the interface 1100 to provide current information about the selected account in real-time.

The interface 1100 includes a context indicator 1102 indicating that the interface 1100 is in the context of the particular selected account. The interface 1100 also provides information about the selected account, such as information 1104 indicating the current state of the account (e.g., current amount of funds held in the account) and information 1106 indicating recent exchanges of data performed on the account. A scroll button 1108 may be provided to enable viewing of additional information 1106.

The interface includes an option 1110 to provide output (e.g., a physical printed output, or an electronic output) showing the information 1106. The interface 1100 also includes selectable options 1112*a*-1112*c* (generally referred to as options 1112) for updating the selected account. The options 1112 may be a subset of the options 1002 provided at the interface 1000 of FIG. 10A. In the example shown, the options 1112 include an option 1112*a* for providing physical output, an option 1112*b* for providing physical input, and an option 1112*c* for exchange of data between accounts. The options 1112 may be dynamically customized depending on the context of the selected account. For example, if the selected account is associated with a particular data format (e.g., foreign currency) for which the automated device is not capable of providing physical output, the option 1112*a* for providing physical output for the selected account may be disabled or not displayed. The interface 1200 also includes general options 710 as discussed above.

Directly in response to selection of the option 1112*b* for updating the account by providing physical input, the method 400 proceeds to 416 where the automated device displays the interface 1300 of FIG. 13 to select the type of physical input (discussed further below). The account to be updated with the physical input is the account associated with the account option selected at the interface 1000.

Figure 5:
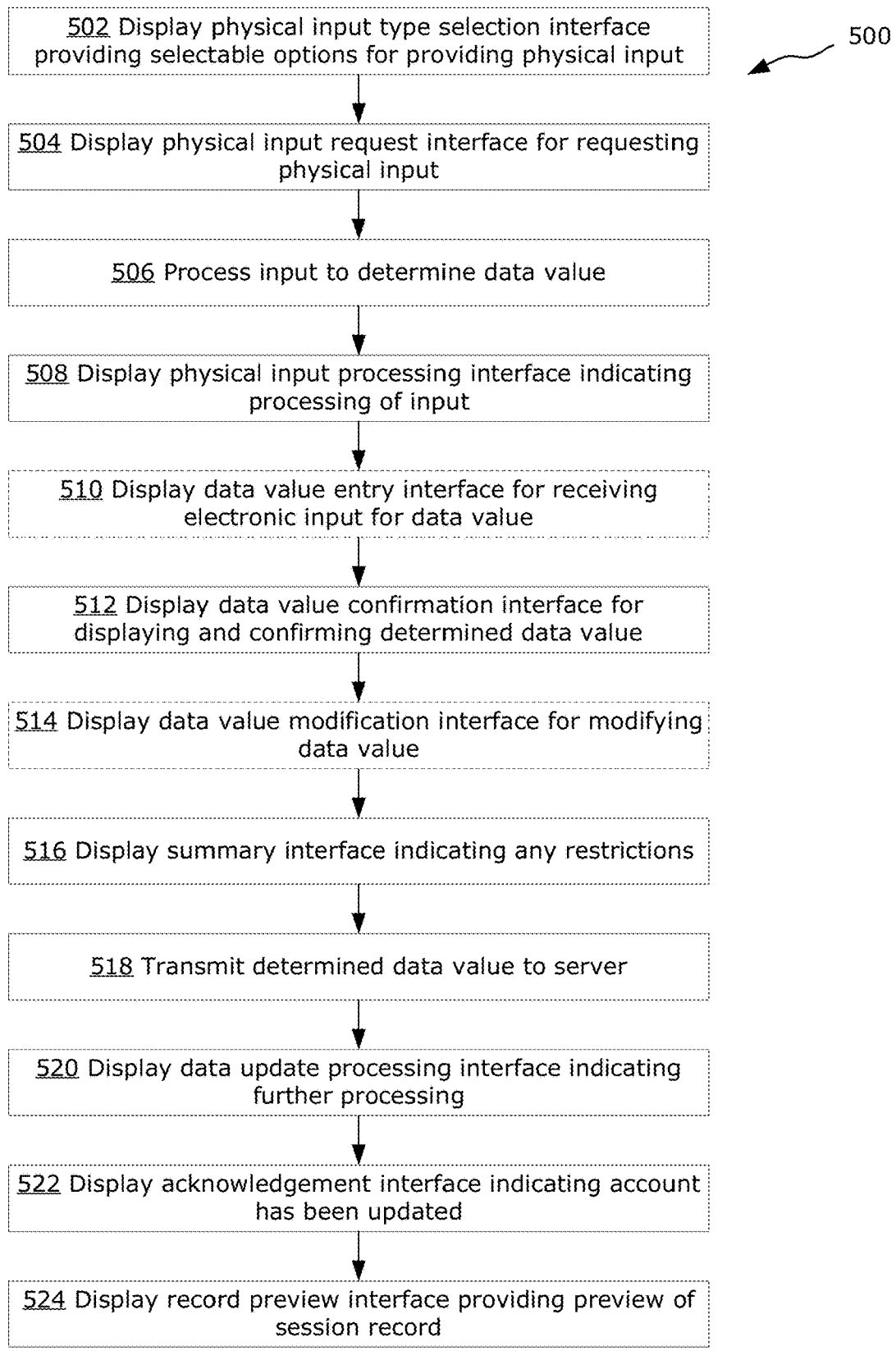
FIG. 5 is a flowchart illustrating an example method for performing an exchange of data at an automated device.

FIG. 5 is a flowchart of an example method 500 for performing an exchange of data at the automated device. The method 500 may follow the method 400 described above. In the method 500, the exchange of data includes receiving physical input at the automated device, for example a check input. The physical input represents a data value that is used for updating the account.

Figure 13:
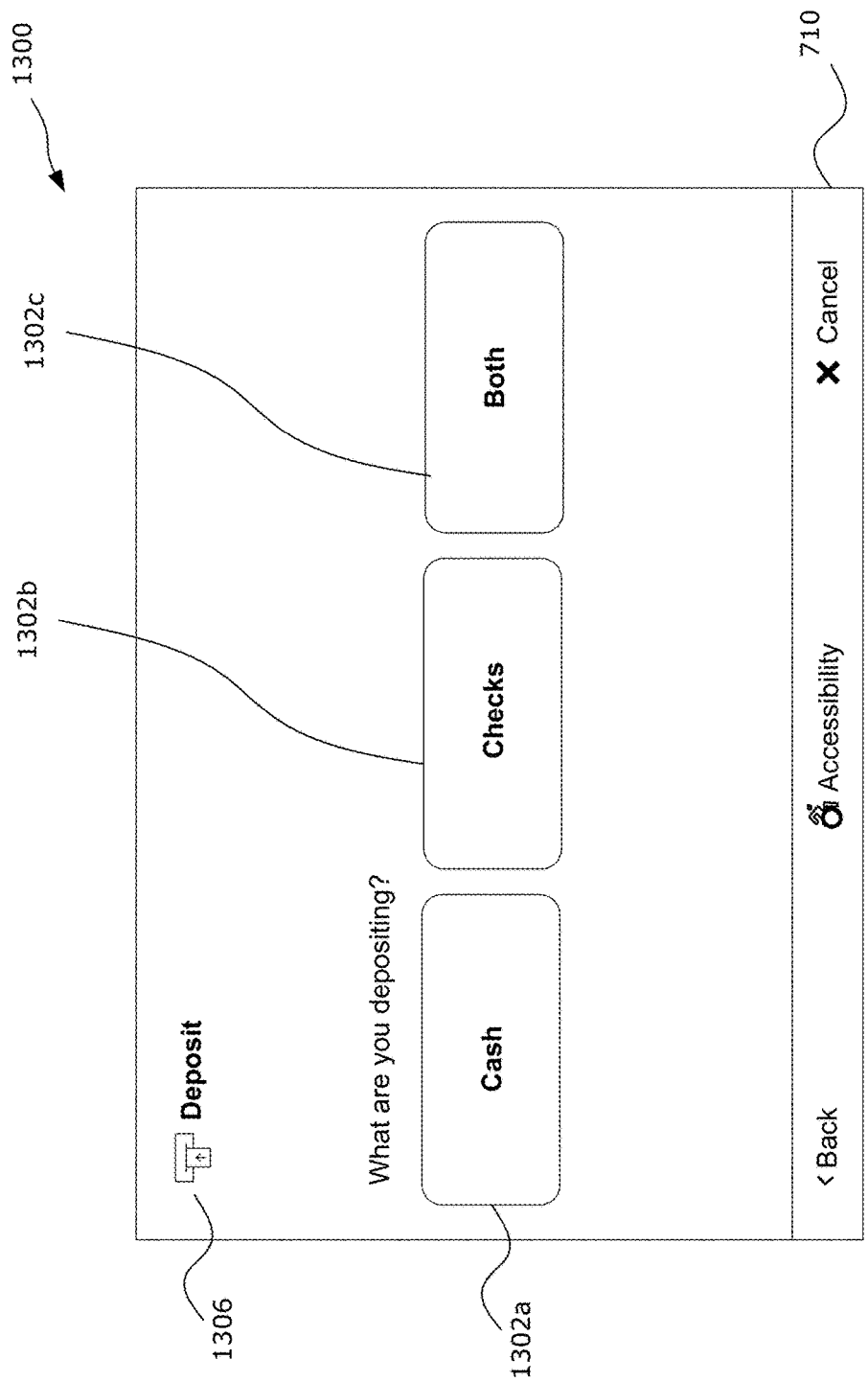
FIG. 13 is an example physical input type selection interface that provides options for providing physical input to the automated device.

At 502, the automated device displays the interface 1300 of FIG. 13 (also referred to as a physical input type selection interface). The interface 1300 provides a plurality of selectable options 1302*a*-1302*c* (generally referred to as selectable option 1302) for providing physical input to the automated device. The physical input is used to update data in an account managed by the server (e.g., a backend server of a service provider, such as a financial institution) with which the automated device communicates. The account may be a user account, which may be identified via an access card inserted into the automated device and via communications with a server, as discussed above. The account may be a user account that is managed by the service provider that is associated with the automated device.

The selectable options 1302 in this example include an option 1302*a* for providing a first type of physical input (e.g., cash), an option 1302*b* for providing a second type of physical input (e.g., check), and an option 1302*c* for providing both the first and second types of physical input. The interface 1300 also includes general options 710 as discussed above.

The interface 1300 also includes a context indicator 1306, which provides information about the context of the currently displayed interface 1300. In this case, the context indicator 1306 indicates that the interface 1300 is part of the interface sequence for performing an exchange of data using physical input.

Figure 14:
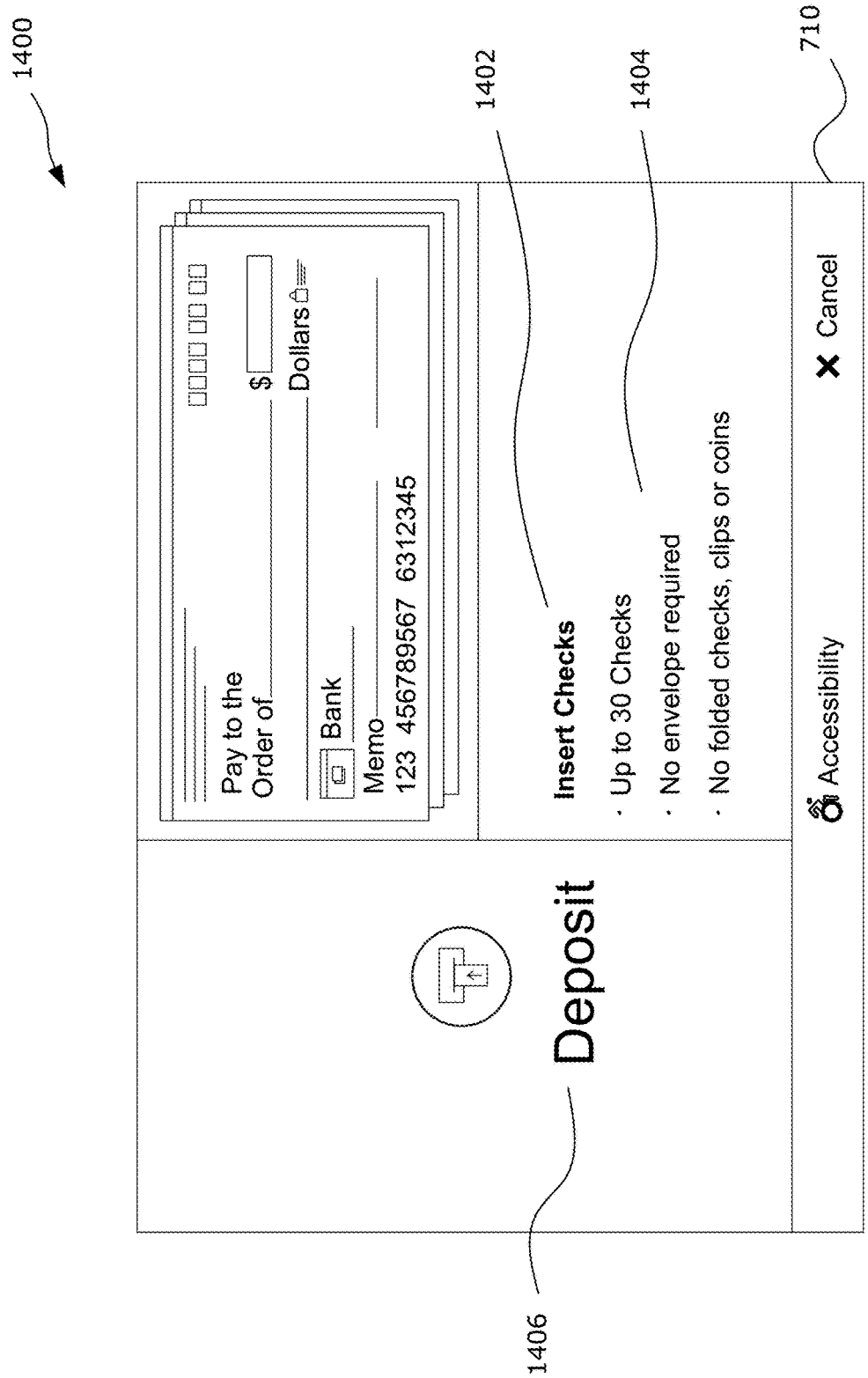
FIG. 14 is an example physical input request interface for requesting a physical input.

Directly in response to selection of the option 1302*b*, the method 500 proceeds to 504 to display the interface 1400 of FIG. 14 (also referred to as a physical input request interface).

The interface 1400 includes a request 1402 to provide the physical input. In this example, the interface 1400 also provides information 1404 that may assist the user to provide the physical input. The interface 1400 includes a context indicator 1406 indicates that the interface 1400 is part of the interface sequence for performing an exchange of data using physical input. The interface 1400 also includes one or more of the general options 710 as discussed above.

When the interface 1400 is displayed, the automated device may provide other output, such as turning on or flashing a light, to indicate the location of an opening (e.g., the input slot 114 as shown in FIG. 1) for receiving the physical input. The automated device may also open a flap or door to permit insertion of the physical input into the opening. The automated device may detect that the physical input has been inserted. For example, an optical scanner (e.g., the scanner 122 as shown in FIG. 2) or other type of sensor may detect insertion of the physical input. After insertion of the physical input has been detected, the automated device may wait for a predetermined period of time (e.g., 3 seconds) in case the user wishes to provide more of the physical input.

At 506, the automated device processes the physical input using the optical scanner. The optical scanner is used to determine a data value for the physical input. The determination of the data value for the physical input may also involve, for example, image processing and/or data recognition (e.g., optical character recognition) performed by a processing unit in the automated device. The data value may be determined for a total of the physical input (e.g., a total value of checks inserted) and/or for each instance of the physical input (e.g., the value of each check inserted).

Figure 15:
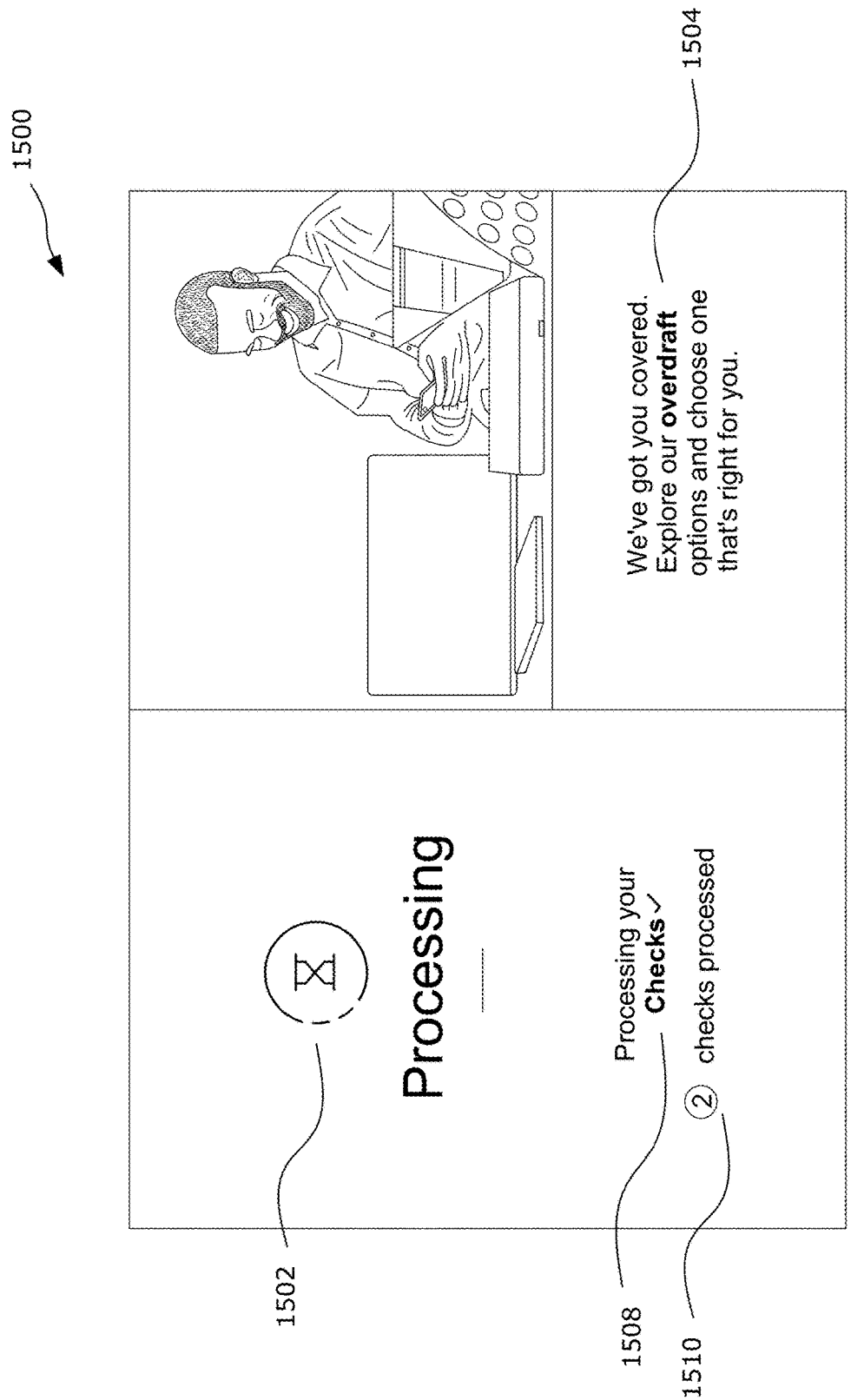
FIG. 15 is an example physical input processing interface indicating processing of the physical input.

At 508, after receiving the physical input and before the processing is finished, the automated device displays the user interface 1500 of FIG. 15 (also referred to as a physical input processing interface). The interface 1500 may be omitted in other embodiments in which the processing or waiting time is negligible.

The interface 1500 in this example includes an animation 1502 to indicate processing. Other indicators, with or without animation, may be used. The user interface 1500 in this example also displays information 1504, which may or may not be similar to the information 904 displayed in the interface 900 of FIG. 9, as discussed above.

The interface 1500 is dynamically updated to reflect the progress in processing the physical input. The interface 1500 displays a progress indicator 1508, which may be displayed when processing of the physical input begins and which may be modified (e.g., with the addition of a checkmark, or other visual modification such as a color change from red to green) to indicate processing of the physical input has finished. The progress indicator 1508 may further be dynamically updated to provide more details about the progress in processing the physical input. In this example, the progress indicator 1508 includes a count 1510 of the number of instances of the physical input that has been processed, and updates the count 1510 accordingly. This further information may be beneficial in cases where processing the physical input takes a longer amount of time, and provides the user with a sense of progress.

When the processing is complete and a data value for the physical input has been determined successfully, the method 500 proceeds to 512, discussed further below.

Figure 16:
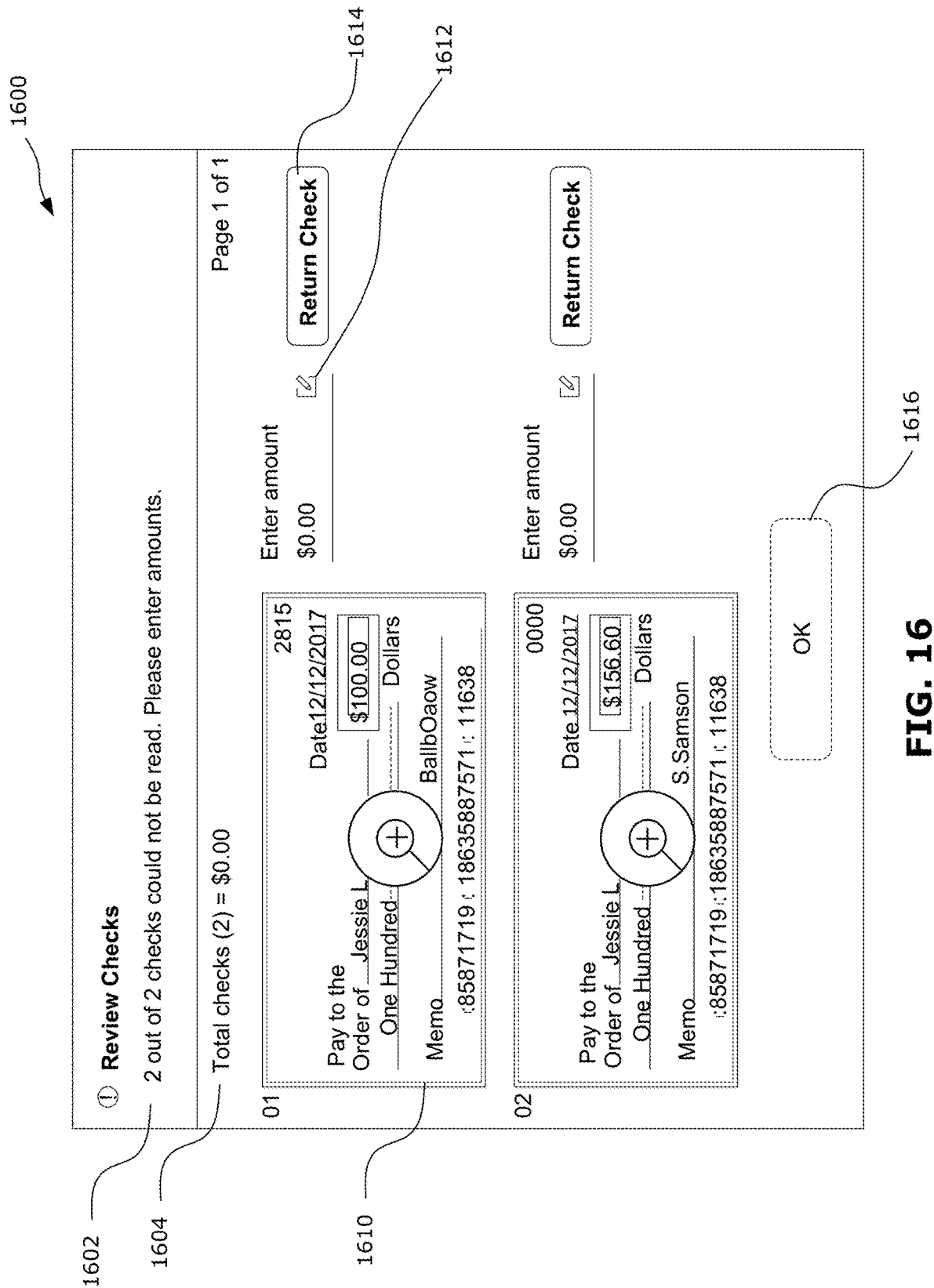
FIG. 16 is an example data value entry interface for receiving electronic input for a data value.

Optionally, if the data value cannot be determined using the optical scanner, the method 500 may proceed to 510 to display the interface 1600 of FIG. 16 (also referred to as a data value entry interface). The automated device may consider that the data value cannot be determined, for example, when the image processing is unable to recognize a data value written on the physical input, or a data value is recognized but with a low level of confidence. The automated device may also consider that the data value cannot be determined when an invalid input has been provided (e.g., the input does not contain any written data value, or is not the requested type of input).

The interface 1600 enables receipt of electronic input representing the data value. The interface 1600 enables the user to interact with the automated device (e.g., via a touchscreen and/or keypad, or other input mechanism) to provide the correct data value corresponding to the physical input.

The interface 1600 provides instructions 1602 requesting electronic input for the data value. If the automated device has determined a data value, but with a low level of confidence, the interface 1600 displays the determined value 1604. The interface 1600 displays a representation 1610 of the physical input, as processed by the optical scanner (e.g., a full-color optical scan of the input). The representation 1610 may be rotated, sized and/or otherwise adjusted (e.g., via image processing performed by the automated device) to present an easily viewable image to the user. The representation 1610 is selectable to display an enlarged view of the representation (discussed further below), and this function may be indicated by a magnifying glass icon. The interface 1600 also provides an option 1612 to enter a value for the data value. The interface 1600 also provides an option 1614 to return the physical input. The interface 1600 includes an option 1616 to confirm the electronic input. The option 1616 may be disabled (e.g., as indicated by graying out the option 1616) until electronic input for the data value has been inputted. Where there are multiple instances of the physical input that require the user to input a value, the option 1616 is disabled until there are values entered for all such instances.

If there are multiple instances of the physical input (e.g., multiple checks) for which a data value cannot be determined, there may be corresponding representation 1610 and options 1612, 1614 for each instance. If there are more instances of the physical input that require electronic input than can be displayed on one screen, a scroll bar (not shown) or other selectable option (not shown) may be provided to enable the user to view all instances. If there are multiple instances of the physical input provided at 504, the interface 1600 may display only the instance(s) for which the data value cannot be successfully determined.

Figure 17:
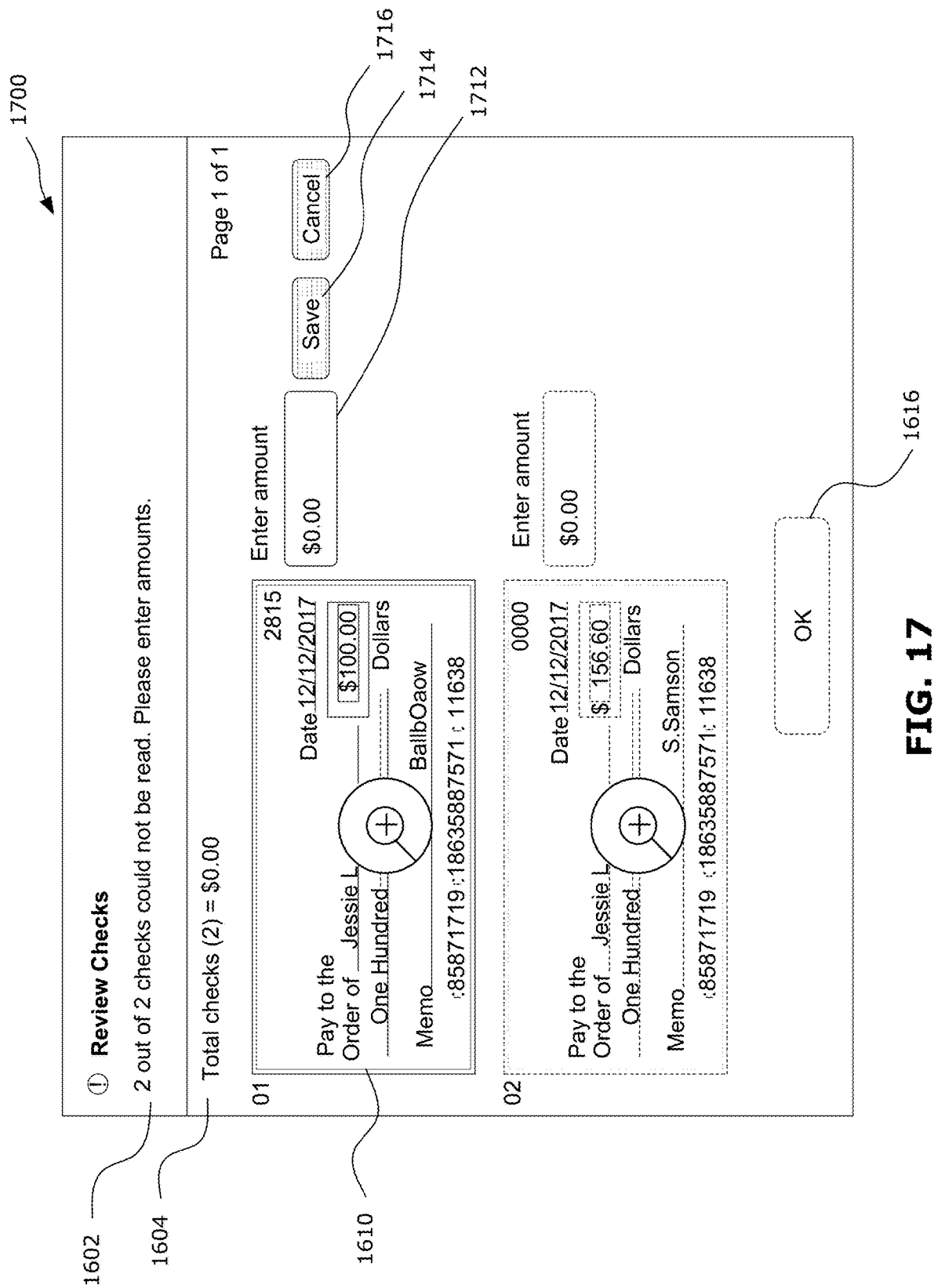
FIG. 17 is another example data value entry interface providing a field for receiving electronic input for the data value.

Directly in response to selection of the option 1612 to enter a value, the automated device displays the interface 1700 of FIG. 17 (also referred to as an alternate data value entry interface). The interface 1700 is similar to the interface 1600, and the two interfaces 1700, 1600 have common elements. The interface 1700 may be considered a sub-screen, a variation or a transition of the interface 1600. Thus, in some cases, the interface 1700 and the interface 1600 may be considered to be the same interface.

In the interface 1700, the option 1612 is replaced with a field 1712 to enter a value. The value may be entered via user interaction with a keypad, touchscreen or other input mechanism of the automated device, for example. The interface 1700 provides an option 1714 to accept the entered value, and an option 1716 to cancel entry. The interface 1700 in this example enables entry of a value for one instance of the physical input, and any other instances requiring input of a value may be grayed out and their associated options disabled.

In response to selection of the option 1716 to cancel entry, the automated device returns to displaying the interface 1600. After a value has been entered in the field 1712 and the option 1714 to accept the entered value has been selected, the automated device displays the interface 1600 with the option 1612 for the particular instance of input updated to reflect the entered value. The interface 1600 may be further modified to indicate that a value has been entered for the particular instance of input. For example, a background color, a highlight color or other visual indicated may be changed (e.g., from red to green) to indicate that a value has been entered.

Figure 18:
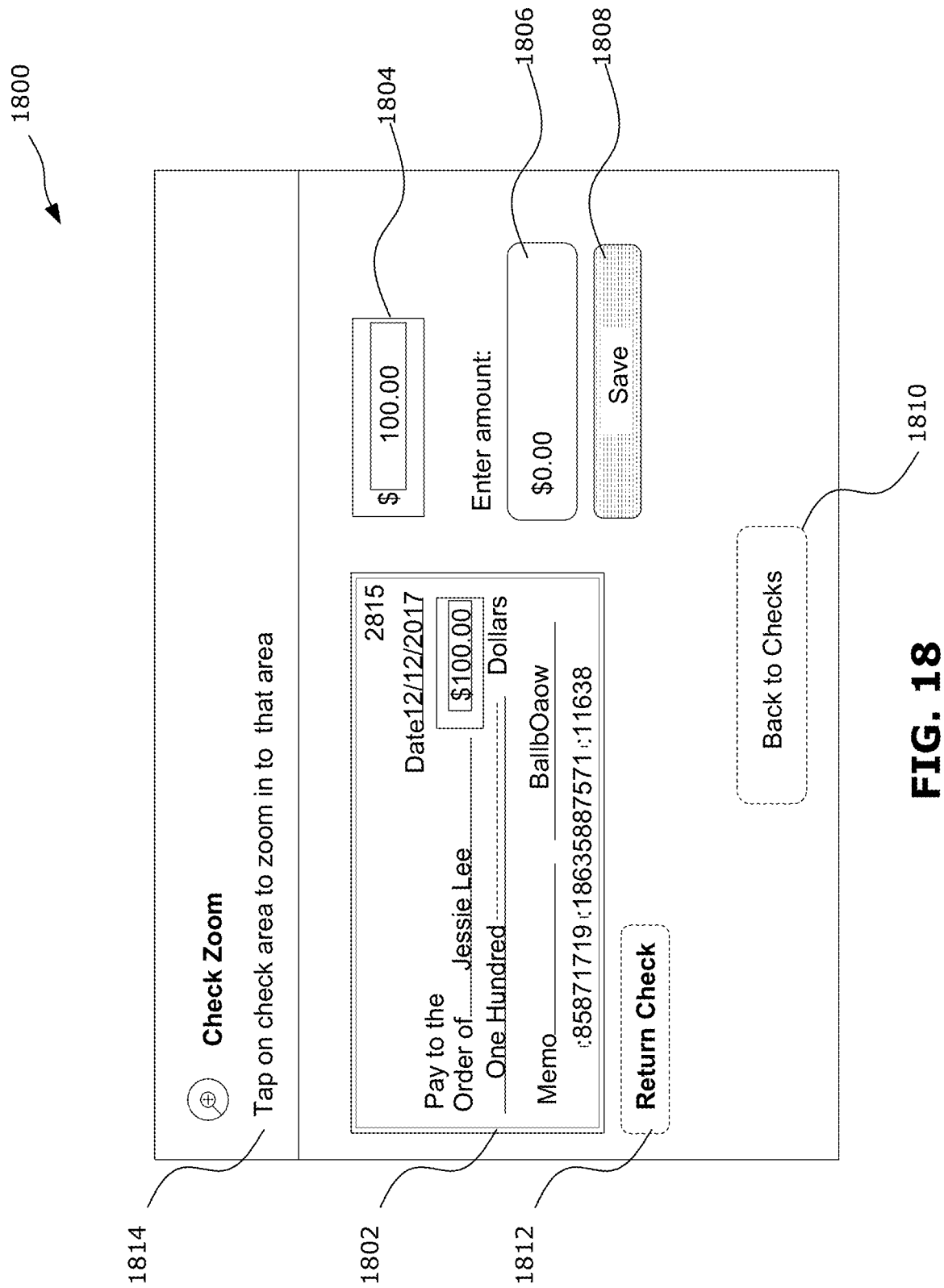
FIG. 18 is an example enlarged view interface providing an enlarged view of a representation of a physical input.

When the representation 1610 is selected at the interface 1700 and a value has not been entered in the field 1712, the automated device displays the interface 1800 of FIG. 18 (also referred to as an enlarged view interface). The interface 1800 displays an enlarged view 1802 of the representation for the particular selected instance of input. Further, the interface 1800 displays a detail view 1804 of a portion of the representation, to help the user to determine the value that should be entered. The portion that is shown in the detail view 1804 may be selected by default to be the particular portion of the representation that is expected to contain information for determining the value of the input. The portion shown in the detail view 1804 may be dynamically changed to a different portion, for example in response to user selection (e.g., by the user interacting with the enlarged view 1802 displayed on the touchscreen) of the different portion.

The interface 1800 includes a field 1806 for entering a value. The value may be entered via user interaction with a keypad, touchscreen or other input mechanism of the automated device, for example. The interface 1800 provides an option 1808 to accept the entered value. The interface 1800 in this example includes an option 1810 to return to a previous interface, and an option 1812 to eject the selected instance of physical input from the automated device. Both the options 1810 and 1812 may be disabled until an entered value has been accepted. The interface 1800 also includes instructions 1814 to guide user interaction with the interface 1800.

Figure 19:
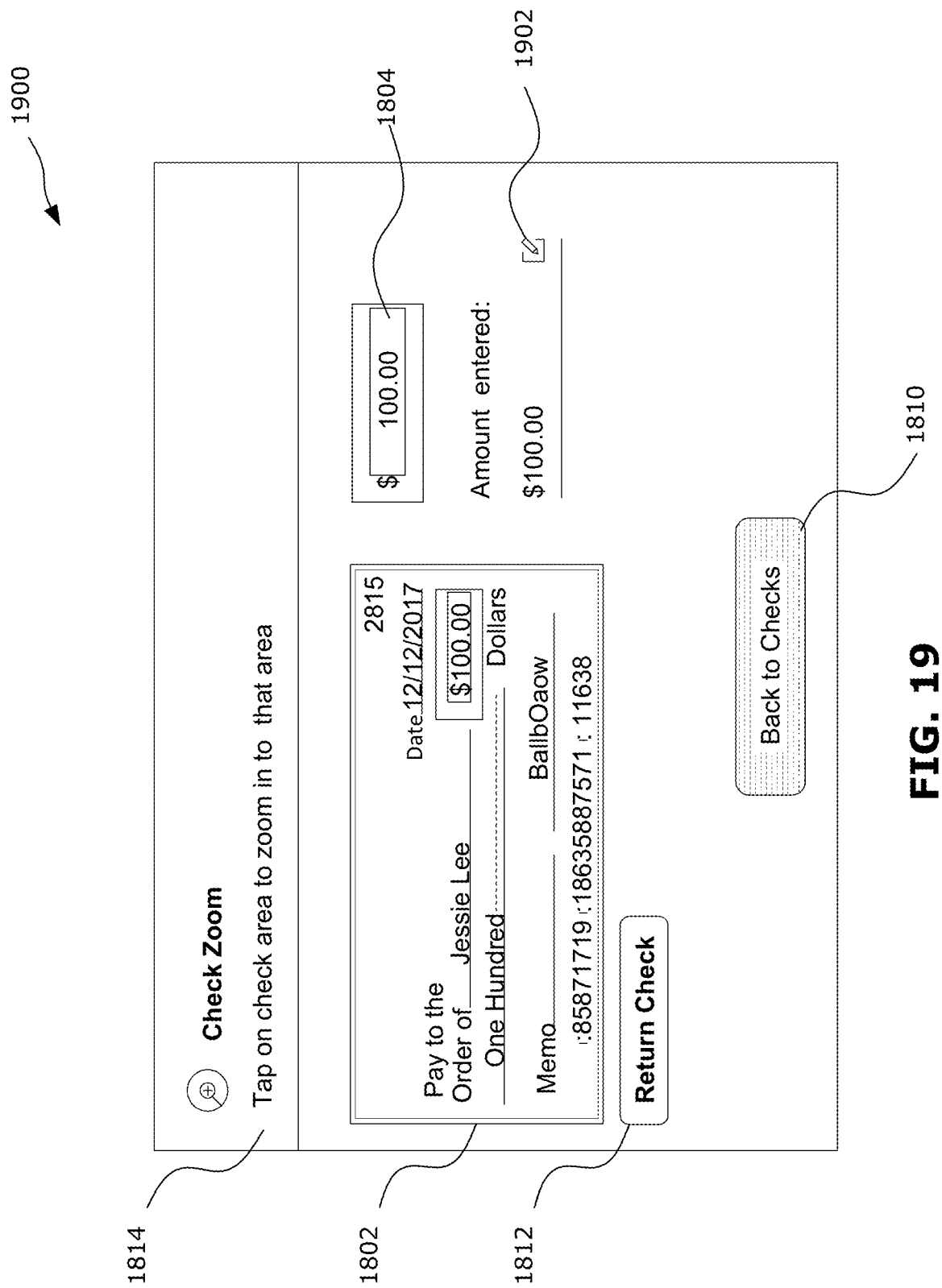
FIG. 19 is another example alternate enlarged view interface providing an enlarged view of a representation of a physical input, and a field for receiving electronic input.

Directly in response to selection of the option 1808 to accept a value entered into the field 1806, the automated device displays the interface 1900 of FIG. 19 (also referred to as an alternate enlarged view interface). The interface 1900 is also displayed in response to selection of the representation 1610 at the interface 1600. The interface 1900 is similar to the interface 1800, and the two interfaces 1900, 1800 have common elements. The interface 1900 may be considered a sub-screen, a variation or a transition of the interface 1800. Thus, in some cases, the interface 1900 and the interface 1800 may be considered to be the same interface.

Instead of the field 1806, the interface 1900 provides an option 1902 to enter a value or to edit an entered value. The option 1902 displays the value that has been entered or that has been determined by the automated device (e.g., using image processing). In the interface 1900, the options 1810 and 1812 are enabled.

Selection of the option 1902 causes the interface 1800 to be displayed. Selection of the option 1812 causes the interface 1600 to be displayed, updated with the entered and accepted value for the particular instance of input. Selection of the option 1810 causes the automated device to return the particular instance of physical input (e.g., ejected from the input slot) and display the interface 1600. The returned instance of input is removed from the representation(s) and option(s) provided on the interface 1600.

Figure 20:
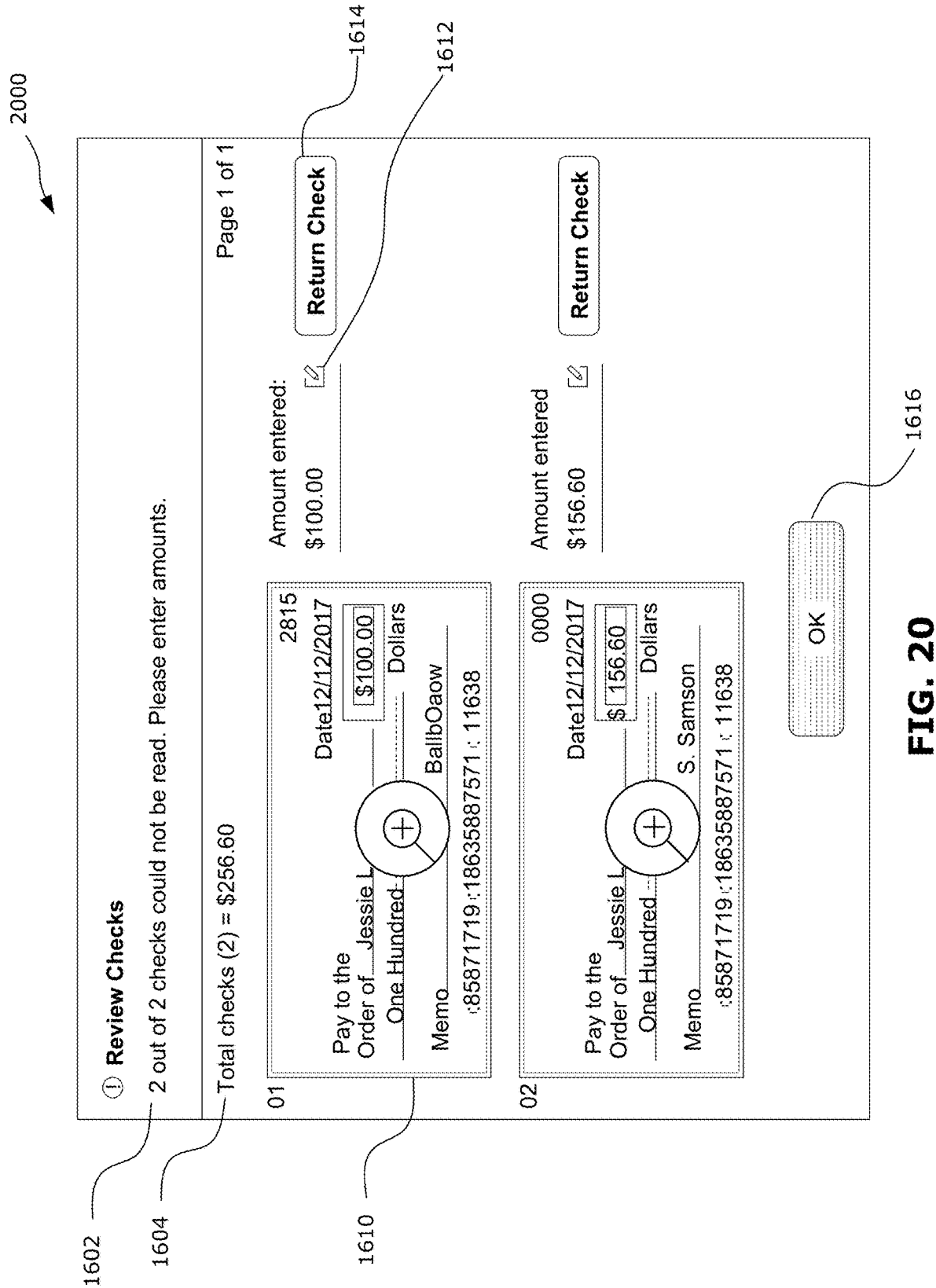
FIG. 20 is another example data value entry interface providing an option to accept an electronic input for the data value.

When a value has been received for all instances of input requiring electronic input of a data value, the automated device displays the interface 2000 of FIG. 20 (also referred to as another example alternate data value entry interface). The interface 2000 is similar to the interface 1600, and the interfaces 2000, 1700 and 1600 have common elements. The interface 2000 may be considered a sub-screen, a variation or a transition of the interface 1600. Thus, in some cases, the interfaces 2000, 1700 and 1600 may be considered to be the same interface.

In the interface 2000, values that have been electronically inputted for each instance of the physical input are displayed in the respective option 1612. The determined value 1604 is updated with the total data value for the physical input (corresponding to the sum of the entered values). The option 1616 is enabled. Compared to the interface 1600, the interface 2000 may have a different background color, different highlight color, different border color or other visual modifications to the interface and/or displayed representations and options, to indicate that values have been entered for the physical input.

If an option to eject the physical input is selected in any of the interfaces 1600, 1700, 1800, 1900, 2000, the physical input may be ejected from the automated device when the option is selected, or may be ejected from the automated device at a later point in the interface sequence (e.g., at the interface 2100 discussed below)

Figure 21:
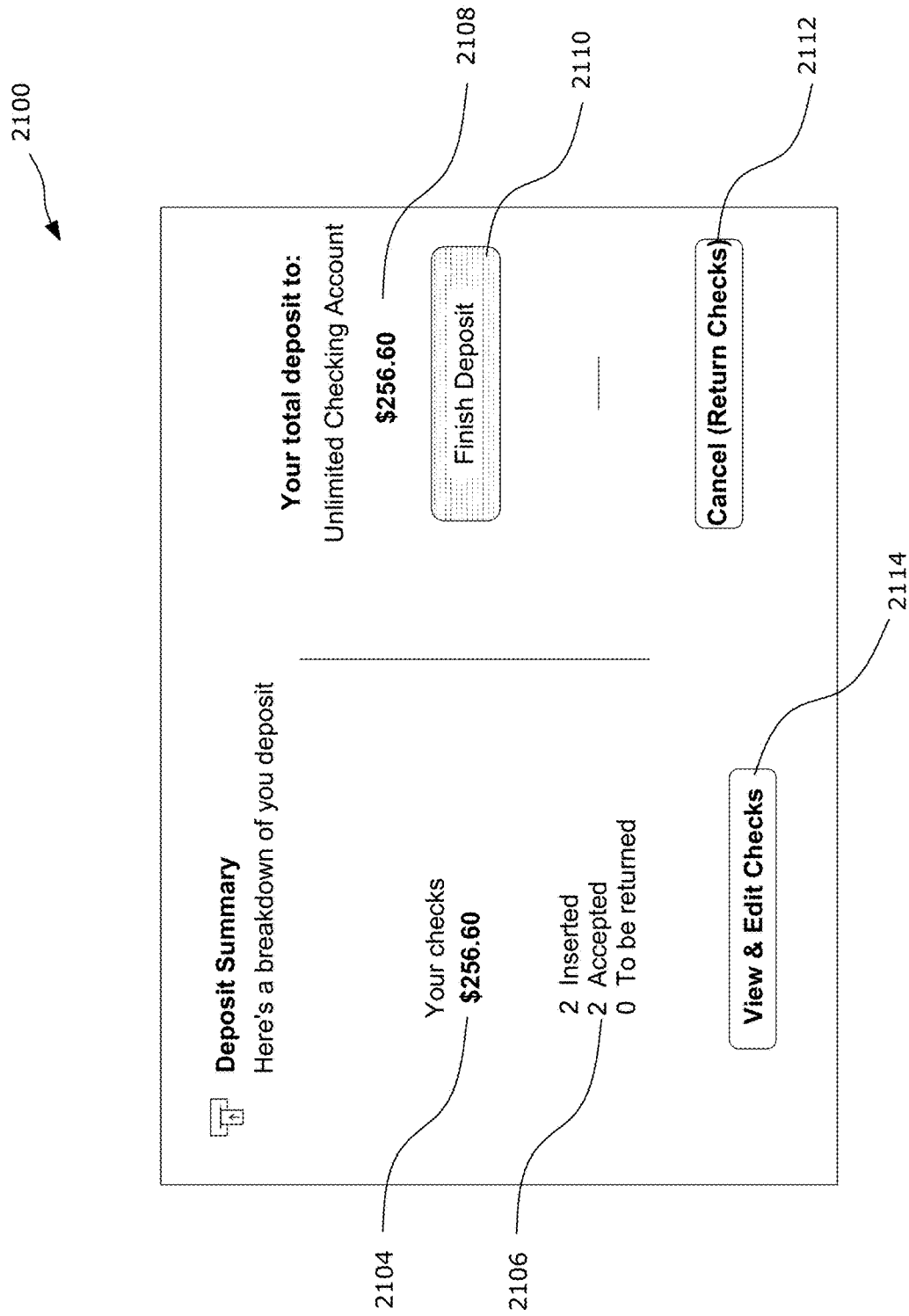
FIG. 21 is an example data value confirmation interface that indicates a data value for the physical input.

Directly in response to selection of the option 1616 to confirm the electronic input of values for the physical input, the method proceeds to 512 to display the interface 2100 of FIG. 21 (also referred to as a data value confirmation interface).

The interface 2100 indicates the data value 2104 for the physical input. Where there are multiple instances of the physical input, the second data value 2104 displays a total value of all instances of the physical input. The interface 2100 displays a breakdown 2106 of the physical input, showing the number of instances received, the number of instances accepted and the number of instances to be returned to the user. The interface 2100 also displays a summary 2108 indicating the account to be updated with the data value.

The interface 2100 provides an option 2110 to confirm the data value, an option 2112 to cancel the data exchange (and return all of the physical inputs) and an option 2114 to modify the data value.

Directly in response to selection of the option 2110 to confirm the data value, the method 500 proceeds to 516, discussed further below.

If the option 2112 is selected to cancel the data exchange, the physical input that was inserted at 504 is ejected from the automated device and the method 500 may end. Alternatively, the method 500 may return to an earlier interface, for example the method 500 may return to 502 to enable the user to select another option for providing physical input.

Figure 22:
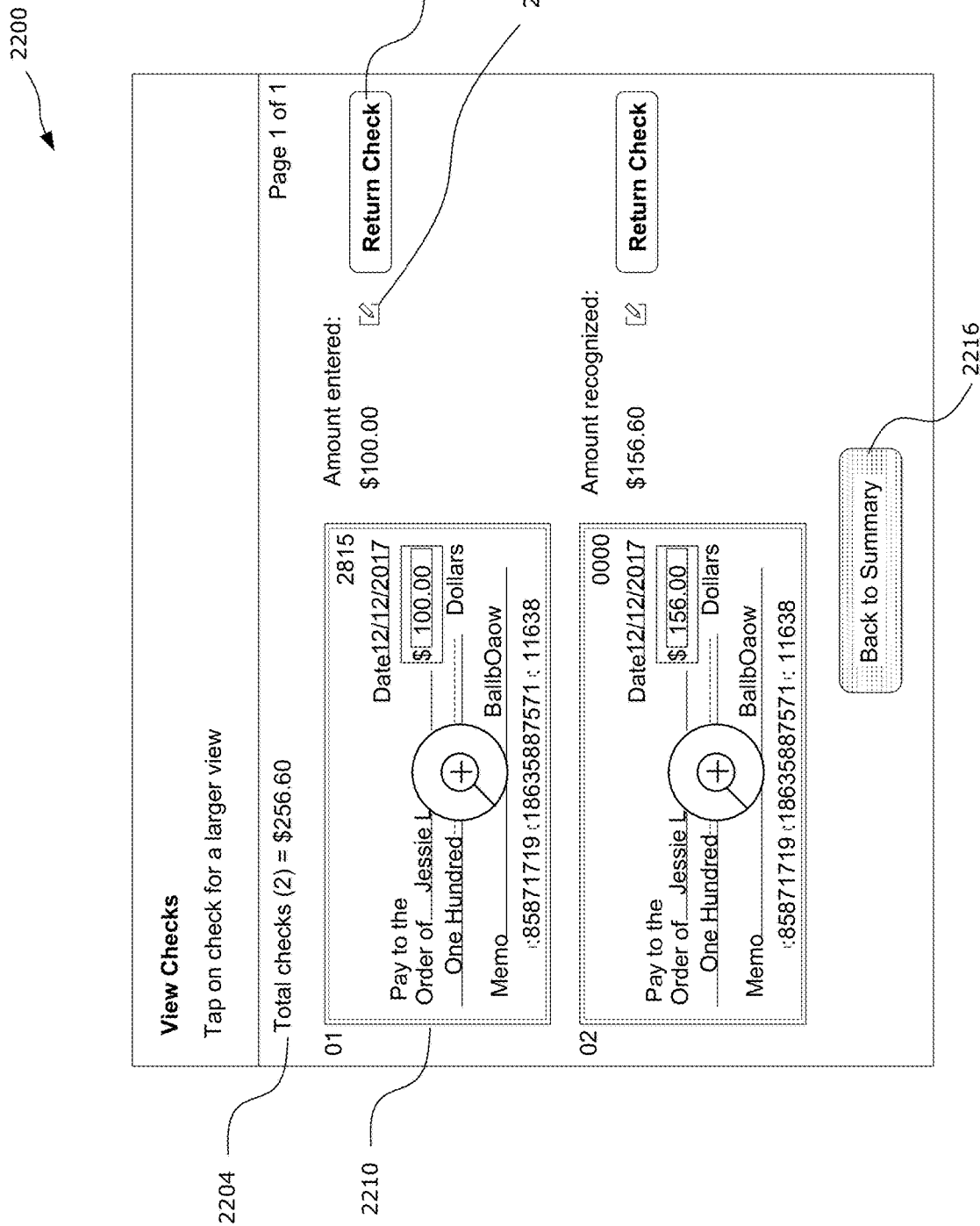
FIG. 22 is an example data value modification interface that enables modification of the data value.

Optionally, directly in response to selection of the option 2114 to modify the data value, the method 500 proceeds to 514 to display the interface 2200 of FIG. 22 (also referred to as a data value modification interface).

The interface 2200 enables the user to provide electronic input to modify the data value. The interface 2200 also enables the user to view each instance of the physical input, without requiring the user to modify or enter a value. The interface 2200 may be similar to the interface 1600 of FIG. 16.

The interface 2200 displays the total data value 2204, and may also indicate the total number of instances received for the physical input. The interface 2200 displays a representation 2210 of each instance of the physical input, as processed by the optical scanner (e.g., a full-color optical scan of the input). The representation 2210 may be rotated, sized and/or otherwise adjusted (e.g., via image processing performed by the automated device) to present an easily viewable image to the user. The representation 2210 is selectable to display an enlarged view of the representation (discussed further below), and this function may be indicated by a magnifying glass icon. The interface 2200 also provides an option 2212 to enter a value for the data value. The option 2212 displays the data value for each instance of the physical input. The option 2212 may further indicate whether the data value displayed was determined automatically by the automated device (e.g., using optical character recognition) or whether the data value displayed was received as electronic input from the user.

The interface 2200 also provides an option 2214 to return the physical input. The interface 2200 includes an option 2216 to return to the interface 2100. If there are more instances of the physical input than can be displayed on one screen, a scroll bar (not shown) or other selectable option (not shown) may be provided to enable the user to view all instances.

Directly in response to selection of the option 2212 to enter a value, the option 2212 is replaced with a field (not shown) to enter a value, an option to accept the entered value, and an option to cancel entry (both options not shown). The value may be entered via user interaction with a keypad, touchscreen or other input mechanism of the automated device, for example.

Figure 23:
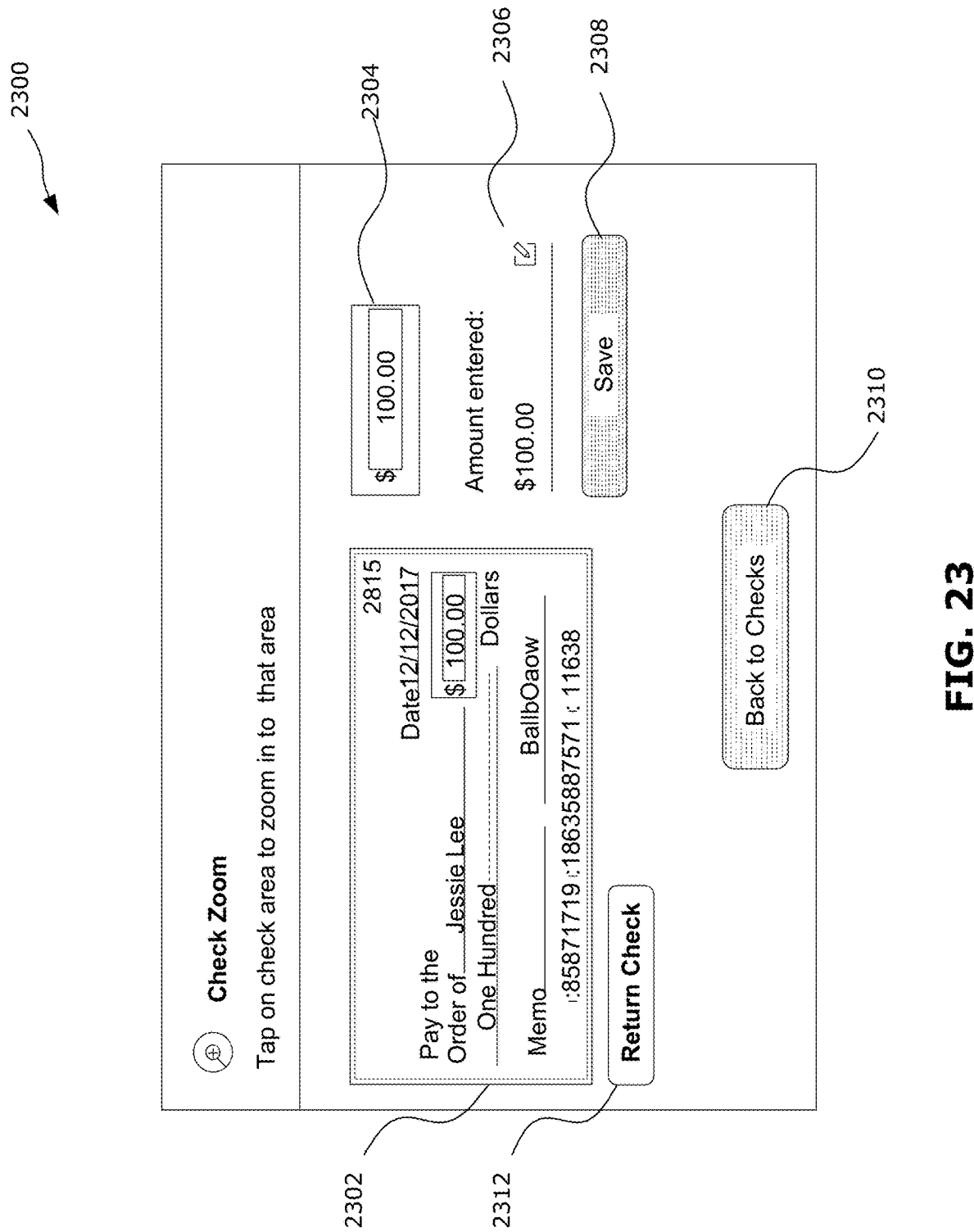
FIG. 23 is another example enlarged view interface providing an enlarged view of a representation of a physical input.

Directly in response to selection of the representation 2210, the automated device displays the interface 2300 of FIG. 23 (also referred to as another example enlarged view interface). The interface 2300 is similar to the interface 1900 of FIG. 19. The interface 2300 displays an enlarged view 2302 of the representation for the particular selected instance of input. Further, the interface 2300 displays a detail view 2304 of a portion of the representation. The portion that is shown in the detail view 2304 may be selected by default to be the particular portion of the representation that is expected to contain information for indicating the value of the input. The portion shown in the detail view 2304 may be dynamically changed to a different portion, for example in response to user selection (e.g., by the user interacting with the enlarged view 2302 displayed on the touchscreen) of the different portion.

The interface 2300 provides an option 2306 to edit the data value. The option 2306 displays the value that has been entered or that has been determined by the automated device (e.g., using image processing). In response to selection of the option 2306, the option 2306 is replaced by a field (not shown) for modifying the value, an option to accept the entered value, and an option to cancel entry (both options not shown). The value may be entered via user interaction with a keypad, touchscreen or other input mechanism of the automated device, for example. The interface 2300 provides an option 2308 to accept the entered value. The option 2308 may only be shown or may only be enabled if the data value has been modified. The interface 2300 in this example includes an option 2310 to return to the interface 2200, and an option 2312 to eject the selected instance of physical input from the automated device. Selection of the option 2308 returns the display to the interface 2200.

From the interface 2200, the selection of the option 2216 causes any modified data value to be accepted and the display returns to the interface 2100. If any data values were modified, the interface 2100 is updated to show the total data value in accordance with the modified data values.

Figure 24:
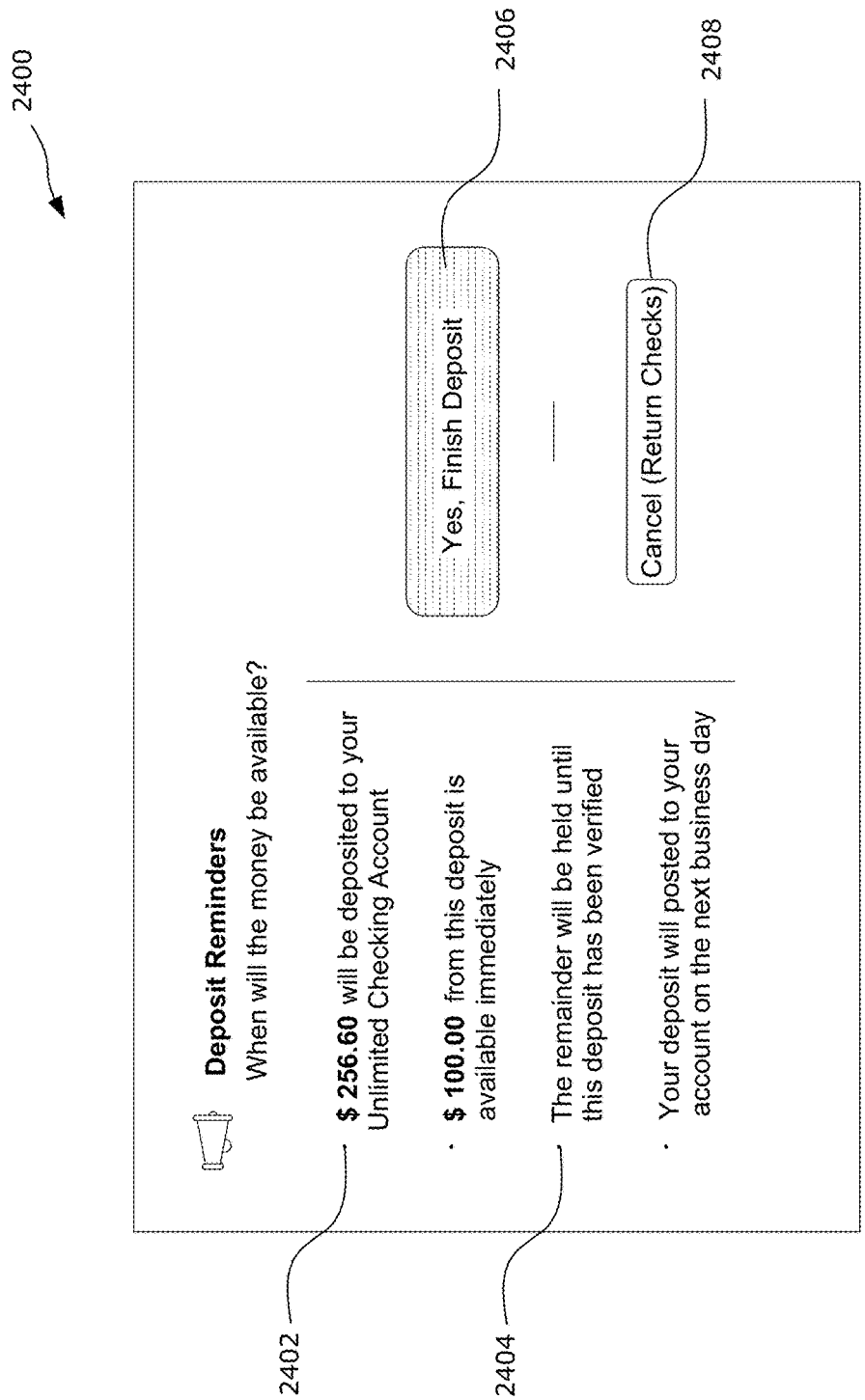
FIG. 24 is an example summary interface providing a summary of data to be updated at an account.

Directly in response to selection of the option 2110 to confirm the displayed data value, the method 500 proceeds to 516 to display the interface 2400 of FIG. 24 (also referred to as a summary interface). The interface 2400 provides a summary 2402 of the data that will be updated at the account.

The interface 2400 also provides indications 2404 of any restrictions associated with the account. The automated device may use information provided by the server to determine any applicable restrictions. Using information provided by the server, the automated device may determine which restrictions, from a database of restrictions, apply to the present account update, and display only the applicable restrictions. For example, depending on the type of account (e.g., as indicated by information provided by the server), there may be holding time period. In another example, the automated device may determine a current day or current time of day, and accordingly determine that the account update will not be posted until the next business day. By displaying only the applicable restrictions, and not the full set of restrictions that are possible, the interface 2400 enables the user to more easily perceive the relevant restrictions and not be inundated with irrelevant restrictions.

The interface 2400 also provides an option 2406 to complete the physical input, and an option 2408 to cancel the data exchange (and return the physical input). If the option 2408 is selected to cancel the data exchange, the physical input that was inserted at 504 is ejected from the automated device and the method 500 may end. Alternatively, the method 500 may return to an earlier interface, for example the method 500 may return to 502 to enable the user to select another option for providing physical input.

Directly in response to selection of the option 2406 to complete the physical input, the method 500 proceeds to 518. The automated device at 518 transmits a signal to a server (e.g., a server associated with the service provider that owns the automated device), for example using a communication module of the automated device. The server may be a backend server that stores and/or manages data for accounts of the service provider. The server may be the server 306 of FIG. 3. In the context of FIG. 3, the automated device 100 may transmit a signal to the server 306 via the communication network 304. The signal includes the data value.

The server performs necessary processing on the received signal. For example, the server may verify if the selected account is capable of accepting the physical input (e.g., whether the format, such as currency, of the input is permitted for the account). If the input is accepted, then the server may update the corresponding account with the data value of the provided physical input. A signal from the server acknowledging receipt of the data value is sent back to the automated device. It should be noted that, in some cases, the server may not necessarily update the account at the time that the physical input is accepted at the automated device. For example, the server may store information about the data value of the physical input and may reconcile the account at a later time, such as end of business day.

Figure 25:
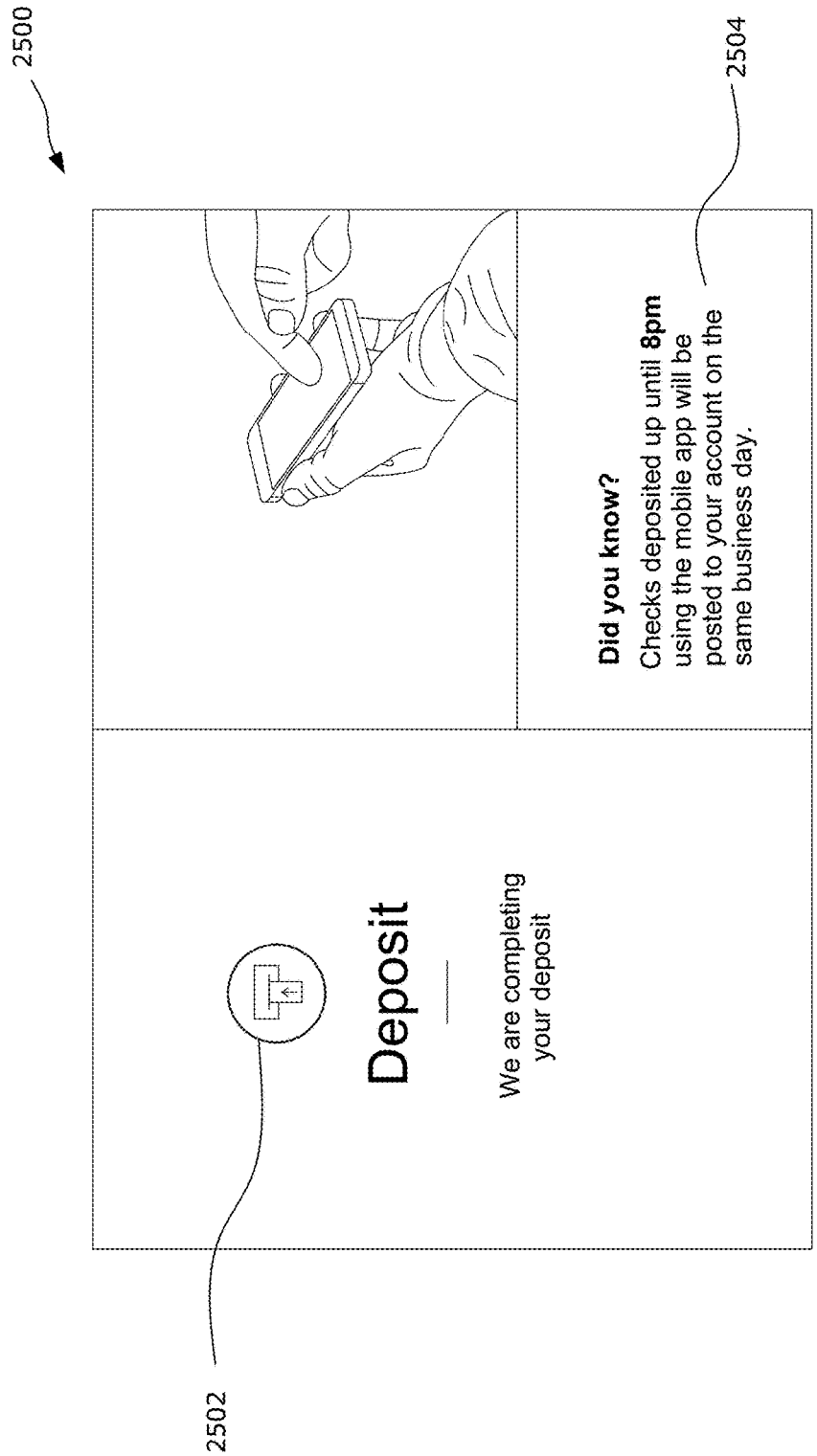
FIG. 25 is an example data update processing interface indicating processing of the physical input.

During communication between the automated device and the server, at 520, the automated device displays the interface 2500 of FIG. 25 (also referred to as a data update processing interface) indicating further processing of the physical input. The interface 2500 may also be referred to as a processing screen or a wait screen. The interface 2500 may be omitted in other embodiments in which the processing or waiting time is negligible.

The interface 2500 in this example includes an animation 2502 to indicate processing. Other indicators, with or without animation, may be used. The user interface 2500 in this example also displays information 2504, which may or may not be similar to the information 904 that may be displayed at the interface 900 of FIG. 9.

Figure 26:
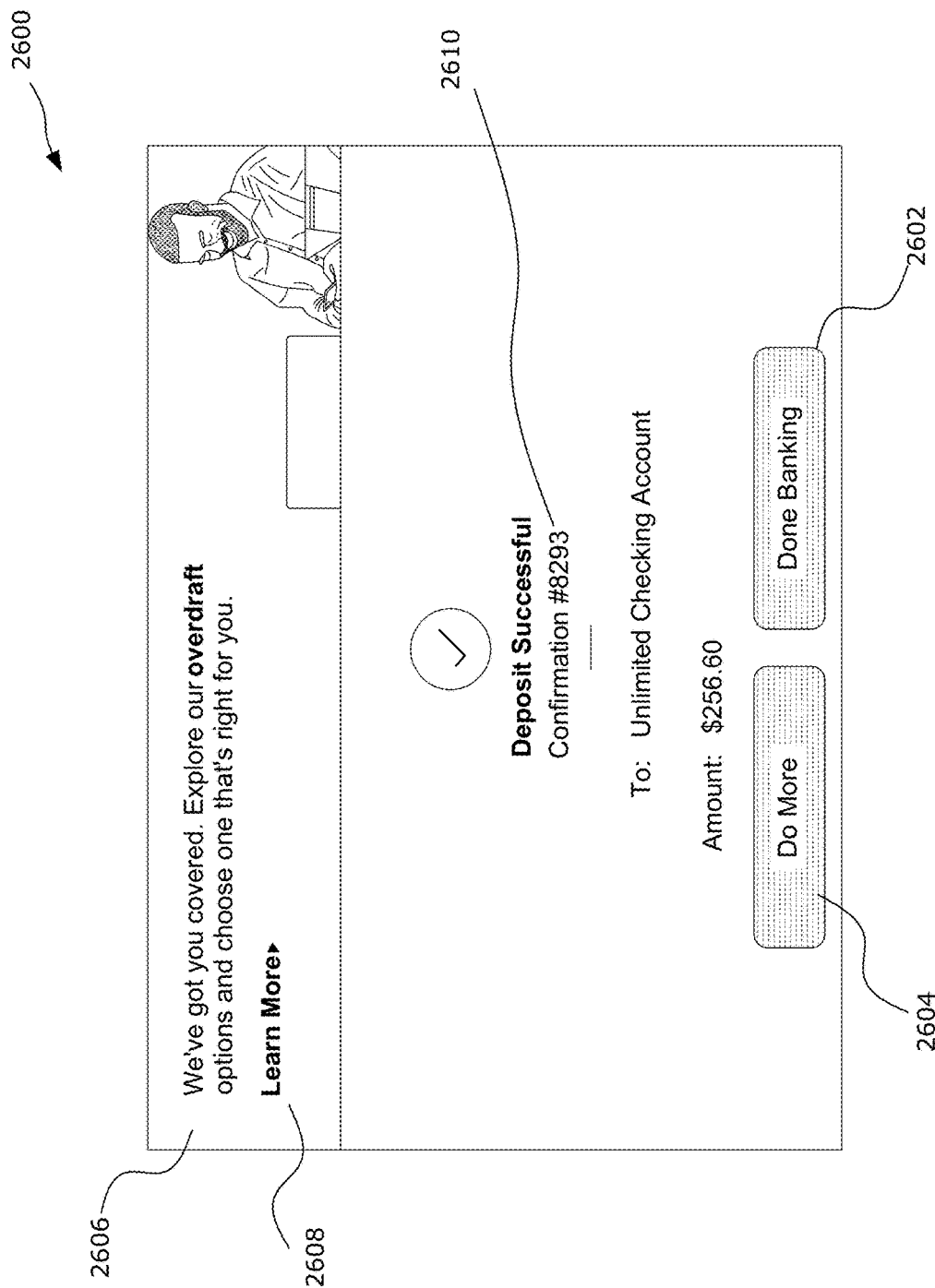
FIG. 26 is an example acknowledgement interface indicating the account has been updated.

Directly in response to receipt of a signal from the server indicating that the account has been updated, at 522 the automated device displays the interface 2600 of FIG. 26 (also referred to as an acknowledgement interface). The interface 2600 indicates the account has been updated and provides details about the update (e.g., the data value used for the update, and the account that is updated). The interface 2600 provides an option 2602 to end the session and an option 2604 to continue the session.

The interface 2600 may also include information 2606, which may be the same as, similar to, or different from the information 904 provided by the interface 900 of FIG. 9. The interface 2600 may also provide a selectable option 2608 to provide additional information further to the information 2606. The interface 2600 may provide tracking data 2610, such as a confirmation number, which may be used to track and/or confirm the update to the account.

If the option 2602 is selected, the automated device may return to a previous interface or another interface to enable the session to continue.

Figure 27:
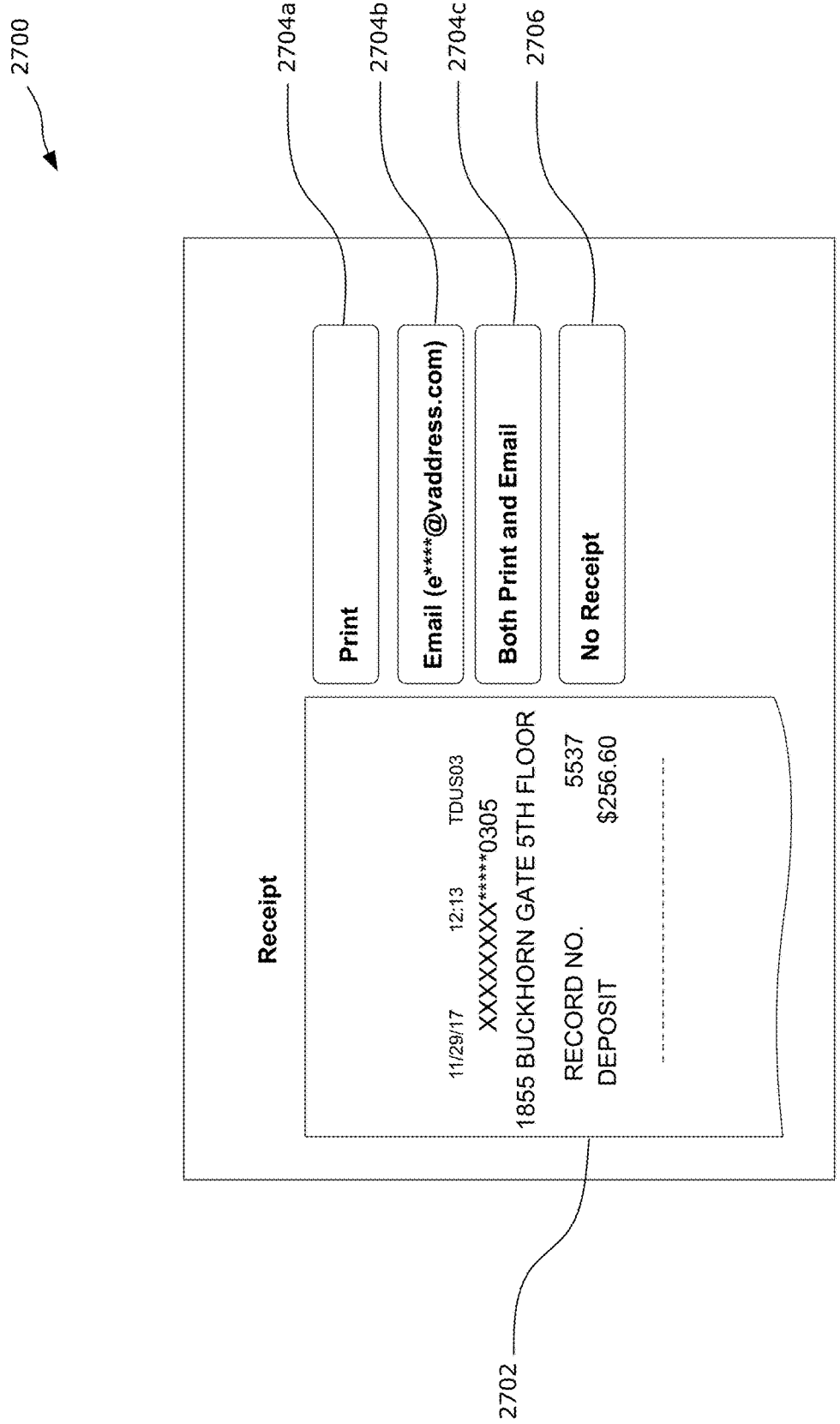
FIG. 27 is an example record preview interface for providing a preview of a record of the session and associated options.

At 524, directly in response to selection of the option 2604 to end the session, the automated device displays the interface 2700 of FIG. 27 (also referred to as a record preview interface). The interface 2700 provides a preview 2702 of a record of the session (e.g., in a visual form similar to a paper receipt). The record includes all data exchanges performed during the session. The interface 2700 also provides one or more options 2704a-2704c (generally referred to as options 2704) to generate output of the record. The options 2704 in this example include an option 2704a to generate a physical output (e.g., paper receipt) of the record, an option 2704b to generate a digital output (e.g., transmission of an email or other digital communication) of the record, and an option 2704c to generate both a physical and a digital output of the record. The interface 2700 also provides an option 2706 to not generate output of the record.

Where a digital output is selected, the digital output may be transmitted to an email address linked to the account. The email address may be predefined and associated with the account, thus avoiding the need for a user to manually input the email address and thereby facilitating a faster and more convenience interaction. For example, the automated device may receive a signal from the server providing the email address. The option 2704b to generate a digital output of the record can thus automatically include at least a preview of the email address. In this way, a user can be sure that the digital output of the record (which may include sensitive, personal information) is being sent to the correct email address. When the digital output is an email and the option 1604b to generate the digital output is selected, a digital version of the record is sent to the email address via the communication module 140. The email may be sent directly by the automated device (e.g., via an email client) or may be sent via the first party server. Where the email is sent via the first party server, the automated device may transmit a signal to the first party server via the communication module, the signal including information for generating the record, and the first party server in turn generates and transmits the email to the email address.

Figure 28:
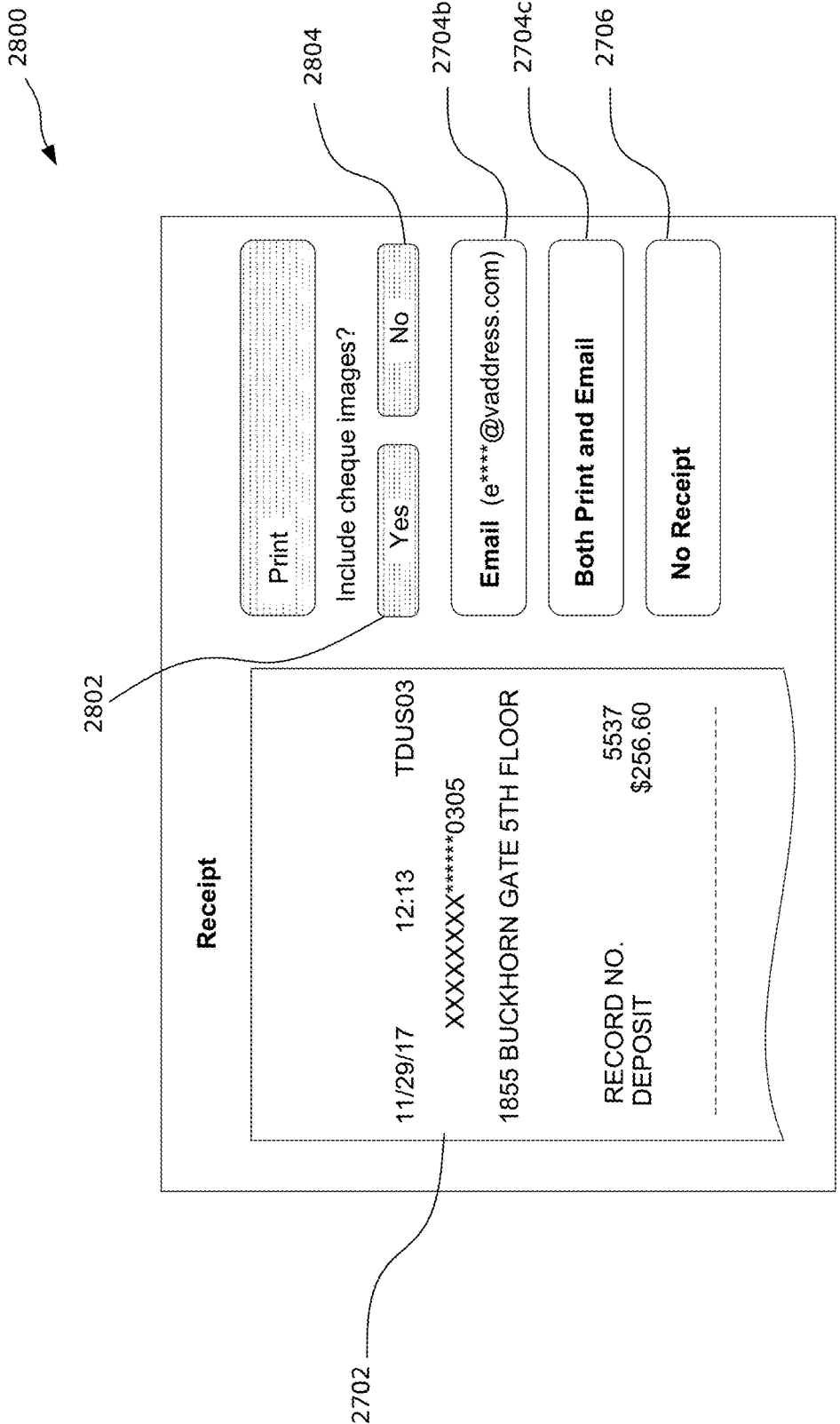
FIG. 28 is an example record output options interface providing an option to include a representation of the physical input in an output of the record.

Optionally, directly in response to selection of one of the options 2704 to generate output of the record, the automated device displays the interface 2800 of FIG. 28 (also referred to as a record output options interface). The interface 2800 is similar to the interface 2700 of FIG. 27, and the two interfaces 2800, 2700 have common elements. The interface 2800 may be considered a sub-screen, a variation or a transition of the interface 2700. Thus, in some cases, the interface 2800 and the interface 2700 may be considered to be the same interface.

The interface 2800 provides an option 2802 to include, in the output of the record, a representation of the physical input as processed by the optical scanner, and an option 2804 to not include the representation.

Figure 6:
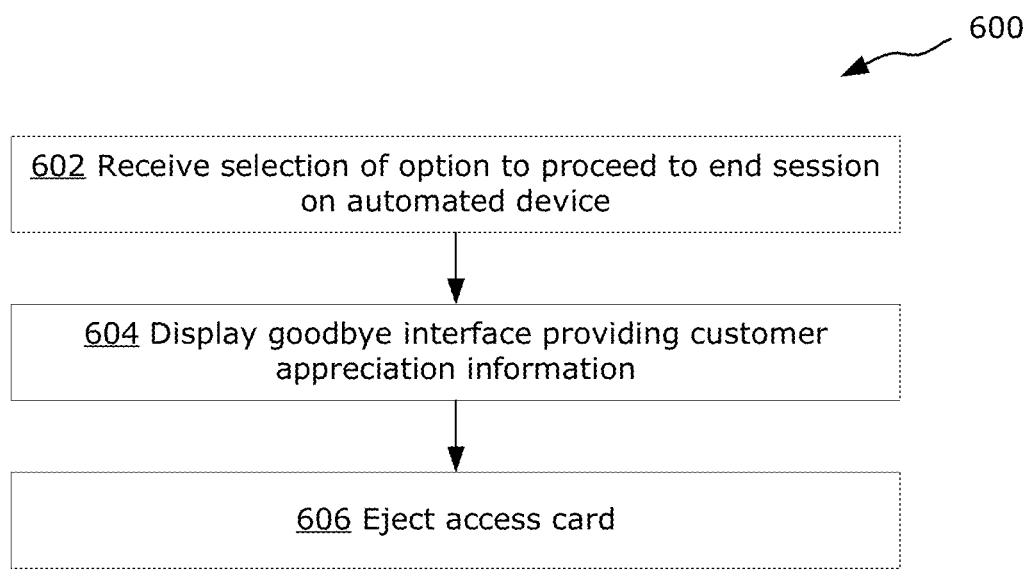
FIG. 6 is a flowchart illustrating an example method for ending a session at an automated device.

FIG. 6 is a flowchart of an example method 600 for ending a session on an automated device. The method 600 may follow the method 500 of FIG. 5. The method 600 may be performed by the automated device 100 illustrated in FIG. 1, for example.

At 602, the automated device receives selection of an option to proceed to end a current session on the automated device. For example, selection of any of the options 2704, 2706 provided by the interface 2700 of FIG. 27 or any of the options 2802, 2804 provided by the interface 2800 of FIG. 28 may be selection of an option to proceed to ending the session.

Figure 29:
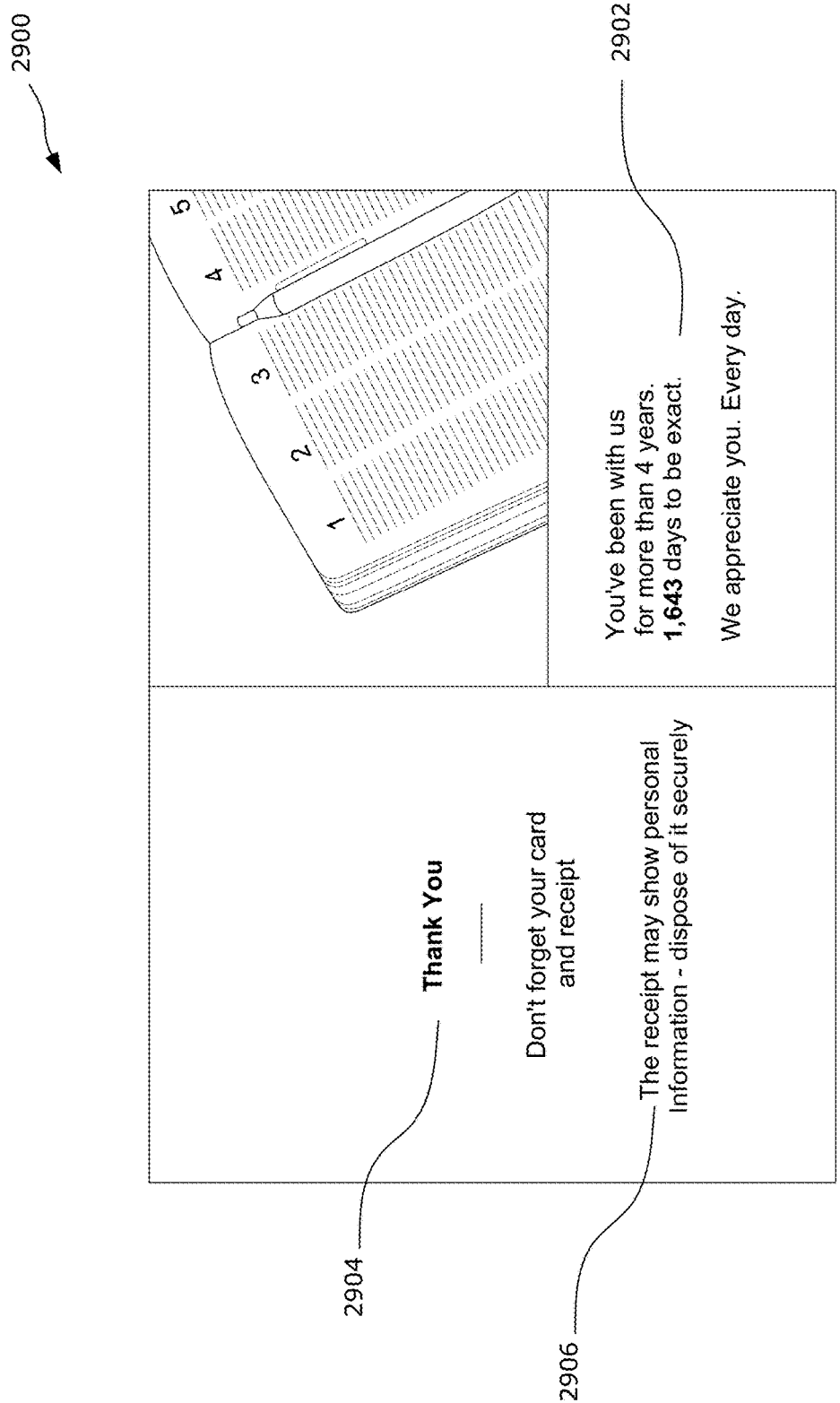
FIG. 29 is an example goodbye interface for providing customer appreciation information.

At 604, directly in response to the selection of any of the options listed above, the automated device displays the interface 2900 of FIG. 29 (also referred to as a goodbye interface). The interface 2900 provides customer appreciation information 2902. The customer appreciation information 2902 may include information specific to the account (e.g., number of days since the account was started with the service provider). The customer appreciate information 2902 may show only non-sensitive information. Certain information about the account may be requested by the automated device from the server, in order to dynamically generate account-specific customer appreciation information 2902. The interface 2900 may also include other information 2904, such as a general thank you message. Other types of information (e.g., similar to the information 904 provided by the interface 900 of FIG. 9) may be provided by the interface 2900. Where the option 2704a or 2704c was selected at the interface 2700 of FIG. 27, to generate a physical output of the session record, the interface 2900 may provide reminder information 2906 relevant to the physical output. Where a physical output was not selected, the reminder information 2906 may be omitted or may be modified to not refer to the physical output.

At 606, the inserted access card is ejected from the automated device. The access card may be ejected while the interface 2900 is being displayed. The interface 2900 may be displayed for a preset length of time (e.g., 5 seconds), or until the automated device detects that the access card has been removed.

Optionally, one or more of the user interfaces discussed above may include display of a background image (which may be the same or may differ between different user interfaces within a session). The background image may include animation for example. The background image may be different for different users, change depending on the season, change depending on the time of day, or have other such variations.

Optionally, one or more of the interfaces discussed above may also include branding, such as the logo of a service provider associated with the automated device.

In some examples, one or more processing or waiting screens may be skipped. For example, processing or waiting time may be negligible and the corresponding processing or waiting screen may not be displayed.

In the present disclosure, the automated device communicates with a server to exchange data which is used to dynamically populate one or more of the interfaces that are displayed by the automated device in a sequence of interfaces. The interfaces are presented in a sequence that provide an improved user experience with an automated device when performing actions related to exchange of data managed by a service provider. For example, the number of interfaces a user must navigate in order to complete an action may be reduced, by ordering the interfaces in a particular sequence. The interfaces also provide more streamlined and efficient interaction, by including contextual or summary information in the interfaces (e.g., visual cues, guidance or nudge) throughout the sequence without cluttering the interfaces with unnecessary information.

It should be appreciated that designing an effective user interface is not a process which is predictable or which lends itself to trial and error given the vast number of permutations that are possible. Factors affecting whether a user interface is effective include identifying efficient interactions which are relatively easy to perform, relatively easy to remember, have discoverability which allows users to discover functions during normal use without formal training, and which can be differentiated from other interactions by users and by the device relatively easily. Arbitrary or poorly considered user interfaces tend to create awkward and unnatural user experiences which make the required interaction harder to perform, harder to remember, undiscoverable (or at least less discoverable), and harder to differentiate from other interactions. Given the complex nature of human-machine interactions, effective user interfaces cannot be reliably predicted. This is known to the person of ordinary skill in the art of user interface design.

Studies performed with regard to examples of the disclosed sequence of interfaces have found increased user satisfaction with respect to interactions with the automated device across a variety of user groups. In example studies comparing the disclosed interface sequence with a conventional sequence for providing physical input to an automated device, it was found that users' perception of ease of use, enjoyment, speed and customization were higher for the disclosed interface sequence compared to the conventional interface sequence.

In some examples, the sequence of interfaces may begin with an interface that displays options that are available at the automated device. The options that are displayed may depend on the account(s) associated with an inserted access card, may depend on the capabilities of the automated device and/or may depend on a current state of the automated device. In this way, a user is provided information about actions that may be performed using the automated device at the very start of the session, prior to entry of an authentication code. This may enable the session to skip displaying another interface that shows available options, and shorten the interface sequence. The user may also be able to determine from the start whether a desired action can or cannot be completed using the automated device.

In some examples, the sequence of interfaces may include interfaces that implicitly or explicitly confirm a selection made in a prior interface. For example, an interface may display contextual information that indicates the interface is part of an interface sequence used to perform a prior-selected action. An interface may also display contextual information to indicate that the action is being performed in the context of a particular prior-selected account.

In some examples, the automated device may provide an interface displaying a preview of a record of the session (e.g., a preview of a transaction receipt). The interface may also provide options for outputting the record, for example printing a physical copy of the record (e.g., using a printer peripheral of the automated device) and/or outputting a digital copy of the record to an email address associated with the account. The interface may exchange data with the backend server in order to retrieve the email address associated with the account (e.g., a primary email address in the case where there are multiple email addresses associated with the user account). In some cases, the interface may also display a preview of the email address (e.g., showing the first several characters of the email address), to assure the user the copy of the record is being sent to the correct email address. The interface may also provide an option to not generate an output of the record, for example the user may be satisfied after viewing the preview of the record on the interface.

In some examples, an interface may display information that is personalized or customized based on the user account. The customized information may be non-sensitive information (e.g., not related to financial data). The non-sensitive information may be a form of customer appreciation information. Such personalized information may be displayed without interfering with the sequence of interfaces required to perform an action. For example, such personalized information may be displayed at the beginning of a session, at the end of a session, or as part of an interface within the sequence. Displaying such non-sensitive, personalized information may help to convey a sense of appreciation, and help to engender user loyalty or goodwill towards the service provider. As an example, the number of days a user has been a customer of the service provider may be displayed at the end of a session. The interface may also display information may be used to inform the user of features and options provided by the automated device and/or service provider associated with the automated device. This may enable new features/options, useful features/options or rarely used features/options to be brought to the user's attention. The information may also provide general user appreciation information, marketing information, or other customized or non-customized information.

Although the present disclosure is described, at least in part, in terms of methods, a person of ordinary skill in the art will understand that the present disclosure is also directed to the various components for performing at least some of the aspects and features of the described methods, be it by way of hardware (digital signal processors (DSPs), application specific integrated circuits (ASICs), or field-programmable gate arrays (FPGAs)), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a data manager) to execute examples of the methods disclosed herein.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising RAM memory, ROM memory, erasable programmable ROM (EPROM) memory, electrically EPROM (EEPROM) memory, and non-volatile RAM (NVRAM) memory. The above memory types are example only, and are thus not limiting as to the types of memory usable for storage of a computer program.

All values and sub-ranges within disclosed ranges are also disclosed. Also, although the systems, devices and processes disclosed and shown herein may comprise a specific plurality of elements/components, the systems, devices and assemblies may be modified to comprise additional or fewer of such elements/components. For example, although any of the elements/components disclosed may be referenced as being singular, the embodiments disclosed herein may be modified to comprise a plurality of such elements/components. The subject matter described herein intends to cover and embrace all suitable changes in technology.

The term "processor" may comprise any programmable system comprising systems using micro- or nano-processors/controllers, reduced instruction set circuits (RISC), ASICs, logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object-oriented databases, and any other structured collection of records or data that is stored in a computer system. The above examples are example only, and thus are not intended to limit in any way the definition and/or meaning of the terms "processor" or "database".

The present disclosure includes figures showing designs in the form of user interfaces in which at least some of the elements are shown with boundary lines illustrated as solid lines. The use of solid or dotted (broken) lines is not intended to be limiting for the purpose of design patent protection or industrial design protection. The designs of the present disclosure are not intended to be limited to the illustrated embodiments in which some design elements are shown in solid boundary lines and other design elements may be shown in dotted lines. It is contemplated that boundary lines that are depicted in the enclosed drawings as solid lines may be disclaimed and replaced with broken boundary lines in some embodiments for the purpose of design patent protection or industrial design protection, and vice versa.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. An automated device comprising:
a display screen;
a communication module for communication with a server;
an optical scanner for processing physical input;
a processor coupled to the display screen, the optical scanner and the communication module; and
a memory coupled to the processor, the memory having machine-executable instructions stored thereon, the instructions, when executed by the processor, causing the automated device to, during a session:
display, on the display screen, a physical input type selection interface providing an option to provide physical input to the automated device, the physical input being used to update data associated with an account managed by the server;
directly in response to selection of the option to provide physical input, display, on the display screen, a physical input request interface requesting the physical input;
process, using the optical scanner, the physical input to determine a data value represented by the physical input;
display, on the display screen, a physical input processing interface providing output indicating processing of the physical input;
when the data value can be determined, by the automated device, using the optical scanner, directly in response to completion of the processing, display, on the display screen, a data value confirmation interface indicating the determined data value, the data value confirmation interface providing an option to confirm the data value;
when the data value cannot be determined, by the automated device, using the optical scanner, display, on the display screen, a data value entry interface for receiving a first electronic input representing the data value, the data value entry interface displaying a representation of the received physical input as processed by the optical scanner, the representation being selectable to display an enlarged view of the representation, and the data value entry interface providing an option to return the physical input and an option to confirm the first electronic input;
directly in response to selection of the option to confirm the data value, display, on the display screen, a summary interface providing indications of any restrictions associated with the account, and also providing an option to complete the physical input;
directly in response to selection of the option to complete the physical input, transmit a first signal to the server, via the communication module, the first signal including the data value;
display, on the display screen, a data update processing interface providing output indicating further processing of the physical input;
directly in response to receipt of a second signal from the server, via the communication module, indicating that the account has been updated with the data value, display, on the display screen, an acknowledgement interface indicating the account has been updated, the acknowledgement interface further providing an option to end the session and an option to continue the session; and
directly in response to selection of the option to end the session, display, on the display screen, and record preview interface, the record preview interface providing a preview of a record of the session, the record preview interface further providing an option to generate output of the record.

2. The automated device of claim 1, wherein the option to generate output of the record includes an option to transmit the output of the record to an email address linked to the account, wherein a third signal is received from the server, via the communication module, the third signal including the email address, and wherein the option to transmit the output of the record to the email address includes a preview of the email address.

3. The automated device of claim 1, wherein the instructions further cause the automated device to:
directly in response to selection of an option on the record preview interface, display, on the display screen, a goodbye interface, the goodbye interface providing non-sensitive customer appreciation information specific to the account.

4. The automated device of claim 1, wherein the instructions further cause the automated device to:
extract information from an access card inserted into the automated device;
transmit a fourth signal to the server, via the communication module, the fourth signal including the information extracted from the access card;
in response to receipt of a fifth signal from the server, via the communication module, the fifth signal providing information identifying the account associated with the access card, display, on the display screen, a welcome interface, the welcome interface providing at least some of a plurality of selectable options for performing an action related to the account;

directly in response to selection of one of the selectable options provided by the authentication interface, display, on the display screen, an authentication interface for inputting an authentication code for the account;

transmit a sixth signal to the server, via the communication module, the sixth signal including a second electronic input received via the authentication interface;

directly in response to receipt of a seventh signal from the server, via the communication module, that the second electronic input is validated for the account, display, on the display screen, an account selection interface, the account selection interface providing a selectable account option; and in response to selection of the selectable account option, proceed to display the physical input type selection interface.

5. The automated device of claim 4, wherein the selectable options displayed on the welcome interface are dependent on actions currently available at the automated device and are further dependent on actions permissible for the account.

6. The automated device of claim 4, wherein the instructions further cause the automated device to, when the option selected at the welcome interface is an option to provide the physical input, display the physical input type selection interface directly in response to selection of the selectable account option, and wherein the account to be updated is associated with the selected account option.

7. The automated device of claim 4, wherein the instructions further cause the automated device to, when the option selected at the welcome interface is an option to display more selectable options:

directly in response to selection of the selectable account option, display, on the display screen, an account information interface, the account information interface displaying information about an account associated with the selected account option, the account information interface providing selectable options for updating the account; and directly in response to selection of an option for updating the account, display, on the display screen, the physical input type selection interface.

8. The automated device of claim 1, wherein the physical input comprises a first physical input and a second physical input, wherein processing of the first physical input is successful and processing of the second physical input is unsuccessful, and wherein the data value entry interface is for receiving the first electronic input only with respect to the second physical input.

9. The automated device of claim 1, wherein the data value confirmation interface provides an option for modifying the determined data value, wherein the instructions further cause the automated device to:

directly in response to selection of the option for modifying the determined data value, display, on the display screen, a data value modification interface for receiving a third electronic input to modify the data value, the data value modification interface displaying a representation of the physical input as processed by the optical scanner, the representation being selectable to display an enlarged view of the representation, and the data value modification interface providing an option to return the physical input and an option to return to the data value confirmation interface; and directly in response to selection of the option to return to the data value confirmation interface, display, on the display screen, the data value confirmation interface.

10. The automated device of claim 1 wherein the instructions further cause the automated device to:

directly in response to selection of the option to generate output of the record, display, on the display screen, a record output options interface, the record output options interface providing an option to include, in the output of the record, a representation of the physical input as processed by the optical scanner.

11. A method at an automated device, the method comprising:

displaying a physical input type selection interface providing an option to provide physical input to the automated device, the physical input being used to update data associated with an account managed by a server in communication with the automated device;

directly in response to selection of the option to provide physical input, displaying a physical input request interface requesting the physical input;

process, using an optical scanner at the automated device, the physical input to determine a data value represented by the physical input;

displaying a physical input processing interface providing output indicating processing of the physical input;

when the data value can be determined, by the automated device, using the optical scanner, directly in response to completion of the processing, displaying a data value confirmation interface indicating the determined data value, the data value confirmation interface providing an option to confirm the data value;

when the data value cannot be determined, by the automated device, using the optical scanner, displaying a data value entry interface for receiving a first electronic input representing the data value, the data value entry interface displaying a representation of the received physical input as processed by the optical scanner, the representation being selectable to display an enlarged view of the representation, and the data value entry interface providing an option to return the physical input and an option to confirm the first electronic input;

directly in response to selection of the option to confirm the data value, displaying a summary interface providing indications of any restrictions associated with the account, and also providing an option to complete the physical input;

directly in response to selection of the option to complete the physical input, transmit a first signal to the server, via a communication module of the automated device, the first signal including the data value;

displaying a data update processing interface providing output indicating further processing of the physical input;

directly in response to receipt of a second signal from the server, via the communication module, indicating that the account has been updated with the data value, displaying an acknowledgement interface indicating the account has been updated, the acknowledgement interface further providing an option to end a session at the automated device and an option to continue the session; and directly in response to selection of the option to end the session, displaying a record preview interface, the record preview interface providing a preview of a record of the session, the record preview interface further providing an option to generate output of the record.

12. The method of claim 11, wherein the option to generate output of the record includes an option to transmit the output of the record to an email address linked to the account, wherein a third signal is received from the server, via the communication module, the third signal including the email address, and wherein the option to transmit the output of the record to the email address includes a preview of the email address.

13. The method of claim 11, further comprising:
extracting information from an access card inserted into the automated device;
transmitting a fourth signal to the server, via the communication module, the fourth signal including the information extracted from the access card;
in response to receipt of a fifth signal from the server, via the communication module, the fifth signal providing information identifying the account associated with the access card, displaying a welcome interface, the welcome interface providing at least some of a plurality of selectable options for performing an action related to the account;
directly in response to selection of one of the selectable options provided by the authentication interface, displaying an authentication interface for inputting an authentication code for the account;
transmitting a sixth signal to the server, via the communication module, the sixth signal including a second electronic input received via the authentication interface;
directly in response to receipt of a seventh signal from the server, via the communication module, that the second electronic input is validated for the account, displaying a account selection interface, the account selection interface providing a selectable account option; and
in response to selection of the selectable account option, proceeding to display the physical input type selection interface.

14. The method of claim 13, further comprising, when the option selected at the welcome interface is an option to provide the physical input, displaying the physical input type selection interface directly in response to selection of the selectable account option, and wherein the account to be updated is associated with the selected account option.

15. The method of claim 13, further comprising, when the option selected at the welcome interface is an option to display more selectable options:
directly in response to selection of the selectable account option, displaying a account information interface, the account information interface displaying information about an account associated with the selected account option, the account information interface providing selectable options for updating the account; and
directly in response to selection of an option for updating the account, displaying the physical input type selection interface.

16. The method of claim 11, wherein the data value confirmation interface provides an option for modifying the determined data value, the method further comprising:
directly in response to selection of the option for modifying the determined data value, displaying a data value modification interface for receiving a third electronic input to modify the data value, the data value modification interface displaying a representation of the physical input as processed by the optical scanner, the representation being selectable to display an enlarged view of the representation, and the data value modification interface providing an option to return the physical input and an option to return to the data value confirmation interface; and
directly in response to selection of the option to return to the data value confirmation interface, displaying the data value confirmation interface.

17. The method of claim 11, further comprising:
directly in response to selection of the option to generate output of the record, displaying a record output options interface, the record output options interface providing an option to include, in the output of the record, a representation of the physical input as processed by the optical scanner.

18. A non-transitory machine readable medium having tangibly stored thereon executable instructions for execution by a processor of an automated device, wherein the instructions, when executed by the processor, cause the automated device to, during a session:
display, on a display screen of the automated device, a physical input type selection interface providing an option to provide physical input to the automated device, the physical input being used to update data associated with an account managed by server in communication with the automated device;
directly in response to selection of the option to provide physical input, display, on the display screen, a physical input request interface requesting the physical input;
process, using an optical scanner of the automated device, the physical input to determine a data value represented by the physical input;
display, on the display screen, a physical input processing interface providing output indicating processing of the physical input;
when the data value can be determined, by the automated device, using the optical scanner, directly in response to completion of the processing, display, on the display screen, a data value confirmation interface indicating the determined data value, the data value confirmation interface providing an option to confirm the data value;
when the data value cannot be determined, by the automated device, using the optical scanner, display, on the display screen, a data value entry interface for receiving a first electronic input representing the data value, the data value entry interface displaying a representation of the received physical input as processed by the optical scanner, the representation being selectable to display an enlarged view of the representation, and the data value entry interface providing an option to return the physical input and an option to confirm the first electronic input;
directly in response to selection of the option to confirm the data value, display, on the display screen, a summary interface providing indications of any restrictions associated with the account, and also providing an option to complete the physical input;
directly in response to selection of the option to complete the physical input, transmit a first signal to the server, via a communication module of the automated device, the first signal including the data value;
display, on the display screen, a data update processing interface providing output indicating further processing of the physical input;
directly in response to receipt of a second signal from the server, via the communication module, indicating that the account has been updated with the data value, display, on the display screen, an acknowledgement interface indicating the account has been updated, the acknowledgement interface further providing an option to end the session and an option to continue the session; and directly in response to selection of the option to end the session, display, on the display screen, a record preview interface, the record preview interface providing a preview of a record of the session, the record preview interface further providing an option to generate output of the record.

* * * * *